United States Patent [19]
Kahn et al.

[11] Patent Number: 6,135,646
[45] Date of Patent: *Oct. 24, 2000

[54] SYSTEM FOR UNIQUELY AND PERSISTENTLY IDENTIFYING, MANAGING, AND TRACKING DIGITAL OBJECTS

[75] Inventors: Robert E. Kahn, McLean; David K. Ely, Oakton, both of Va.

[73] Assignee: Corporation for National Research Initiatives, Reston, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/808,050

[22] Filed: Feb. 28, 1997

Related U.S. Application Data

[63] Continuation of application No. 08/142,161, Oct. 22, 1993, abandoned.

[51] Int. Cl.[7] .................................................. G06F 13/00
[52] U.S. Cl. ........................ 395/200.47; 395/200.49; 707/104
[58] Field of Search ............................ 395/616, 421.1, 395/677, 610, 615, 187.01, 200.49, 200.47; 380/4; 707/104

[56] References Cited

U.S. PATENT DOCUMENTS

| | | | |
|---|---|---|---|
| 4,914,571 | 4/1990 | Baratz et al. | 395/610 |
| 4,937,863 | 6/1990 | Robert et al. | 380/4 |
| 4,953,209 | 8/1990 | Ryder, Sr. et al. | 380/23 |
| 5,032,979 | 7/1991 | Hecht et al. | 395/187.01 |
| 5,222,134 | 6/1993 | Waite et al. | 380/4 |
| 5,230,051 | 7/1993 | Quan | 395/700 |
| 5,239,648 | 8/1993 | Nukui | 395/610 |
| 5,241,671 | 8/1993 | Reed et al. | 395/615 |
| 5,260,999 | 11/1993 | Wyman | 380/4 |
| 5,321,841 | 6/1994 | East et al. | 395/677 |
| 5,339,403 | 8/1994 | Parker | 395/421.1 |
| 5,357,630 | 10/1994 | Oprescu et al. | 395/600 |
| 5,375,206 | 12/1994 | Hunter et al. | 395/700 |
| 5,491,817 | 2/1996 | Gopal et al. | 395/616 |
| 5,596,744 | 1/1997 | Dao et al. | 395/610 |
| 5,638,443 | 6/1997 | Stefik et al. | 380/4 |

FOREIGN PATENT DOCUMENTS

WO 91/12583  8/1991  WIPO.

OTHER PUBLICATIONS

CNRI Brochure, Workshop on the Protection of Intellectual Property Rights In A Digital Library System, "Knowbots In The Real World", May 18–19, 1989.

Kahn, Robert E. et al., "The Digital Library Project—Volume I: The World of Knowbots (Draft)", An Open Architecture for a Digital Library System and a Plan for Its Development, Mar. 1988 (49 pp) and Dec. 1987 (75 pp).

Garrett, John R. et al., Copyright Clearance Center, "Text to Screen: Copyright Issues in the Electronic Age", pp. 1–12, Copyright 1989.

Garrett, John R. et al., Copyright Clearance Center, "Toward a Copyright Management System for Digital Libraries", pp. 1–74, Copyright 1991.

Kahn, Robert E., "Deposit, Registration and Recordation in an Electronic Copyright Management System", *IMA Intellectual Property Project Proceedings*, Jan. 1994, vol. 1, Issue 1, pp. 111–120.

Kahn, Robert and Robert Wilensky, "Locating Electronic Library Services and Objects: A Frame of Reference for the CS–TR Project", Feb. 1994 and later versions.

Kahn, Robert et al., "A Framework for Distributed Digital Objects Services", May 13, 1995.

Kahn, Robert, "National Information Infrastructure Components", *Serials Review*, vol. 18, No. 1–2, 1992.

(List continued on next page.)

*Primary Examiner*—Le Hien Luu
*Attorney, Agent, or Firm*—Fish & Richardson P.C.

[57] ABSTRACT

Methods of managing digital objects in a network are presented. Holders of rights in digital objects are enabled to control terns and conditions under which they are accessed by users in a network, or are granted to others.

14 Claims, 25 Drawing Sheets

OTHER PUBLICATIONS

Lyons, Patrice A., "Knowledge–Based Systems and Copyright", *Serials Review*, pp. 88–91, 1992.

Kahn, Robert E, Deposit, Registration and Recordation in an Electronic Copyright Management Systems, 18 pp (published Oct. 1992).

Dunstan, James E. et al., "Access to Digital Objects: A Communications Law Perspective", Annual Survey of American Law, NY University School of Law, 1994 Volume, Issue 3.

Lagoze, Carl et al., "Implementation Issues in an Open Architectural Framework for Digital Object Services", Jun. 6, 1995—Revision 1.3.

Kahn, Robert E., Deposit, Registration and Recordation in an Electronic Copyright Management System, Corporation for National Research Initiatives, Reston, VA, Aug., 1992.

Lyons, Patrice, Computer Programs: A Fair Use Analysis, Twenty–First Annual Telecommunications Policy Research Conference, Solomons, MD, Oct. 2–4, 1993.

Copyright Clearance Center Online, Apr. 6, 1995, Danvers, MA, Press Release.

EPR Electronic Commerce Technologies Press Release, "Breakthrough Digital Rights Protection Information Metering Architecture with a Universal Digital Content and Commerce Container", Apr. 10, 1995, Press Release, San Jose, CA, Internet World 95—EPR Inc.

Cerf et al., "A Protocol for Packet Network Intercommunication,", IEEE Transactions On Communications, vol. Com–22, No. 5, May 1974, pp. 637–648.

Cerf et al. "Issues in Packet Network Intercommunication", Proceedings of the IEEE, vol. 66, No. 11, Nov, 1978, pp. 1386–1408.

Kahn, "Resource–Sharing Computer Communications Networks", Proceedings of the IEEE, vol. 60, No. 11, Nov. 1972, pp. 1397–1407.

Postel, "NCP/TCP Transition Plan", USC/Information Sciences Institute, Nov, 1981.

Mockapetris, "Domain Names—Concepts and Facilities", http://www.ietf.org/rfc/rfc0882.txt., Nov. 1983. pp. 1–28.

Mockapetris, "Domain Names—Implementation and Specification", http://www.ietf.org/rfc/rfc0883.text., Nov., 1983, pp. 1–67.

SYSTEM FOR UNIQUELY AND PERSISTENTLY IDENTIFYING, MANAGING, AND TRACKING DIGITAL OBJECTS

This is a continuation of application Ser. No. 08/142,161, filed Oct. 22, 1993, now abandoned.

BACKGROUND

This invention relates to digital objects and associated rights and payments.

By a "digital object" we broadly mean any set of sequences of bits or digits and an associated unique identifier which we call a "handle". A digital object may incorporate information or material in which rights (e.g., copyright rights) or other interests are or may be claimed. There may also be rights associated with the digital object itself. Thus digital objects may include conventional digital representations of works (books, papers, images, sounds, software), and more broadly any digital material which is capable of producing desired manifestations for a computer user. Thus, a digital object could include programs and data which, though not directly a representation of the text of a work, enable the delivery over a network and the subsequent reproduction on a computer screen of selected portions of the text of the work. By the notion of rights which are or may be claimed in a digital object, we mean rights which exist under statute (e.g., copyright, patent, trade secret, trademark), or as a result of private action (e.g., via secrecy, cooperative ventures, or negotiation).

Rights are normally protected under the law by mechanisms that are paper-based. Patent and trademark applications are prosecuted by exchanges of paper with the Patent and Trademark Office. Trade secret rights are often protected by appropriate legends on paper, and by physically guarding paper copies against disclosure. Registration of claims in copyright is largely based on a paper system. Registration systems generally involve providing physical copies (sometimes voluminous) to the registering authority of the object to be registered.

Holders of rights may get value from those rights by allowing others to copy, use, or perform the object covered by the rights in exchange for consideration (e.g., a photographer may sell copies of his photographs). In some situations there may no need for negotiation of the terms, which may be simple and well understood. The working out of compensation may be done automatically by private clearing house operations, such as the Copyright Clearance Center (as to photocopying) or ASCAP and BMI (in the music field).

In other situations the rights holders may derive value by granting to others exclusive rights to disseminate the object in exchange for a royalty (e.g., a book author grants a publisher the North American paperback distribution rights). Exclusive rights are typically subject to direct negotiation.

It is common to provide for central registration of ownership and other exclusive rights so that others may know the timing and terms of those rights.

Making digital objects available on networks (e.g., Internet), gives rise to at least four specific activities of concern. The first is the ease of movement of digital objects already contained in a computer network environment allowing the creation of multiple copies in multiple machines in fractions of a second. The second is the importation of external information, such as print material or isolated CD-ROM based material, which must first be scanned or read into the system before it can be used. The third is export of internal network based information to paper using digital printers or facsimile machines or copying to separable media such as tape or DAT for external transport to others. The fourth is that digital objects may be easily manipulated on a computer to produce derivative works. The derivative works can also be easily moved about in a computer network environment and be subject to further manipulation by other parties. Parallel and concurrent manipulation can generate an exponential proliferation of derivative works.

Several technologies are known for handling privacy and authentication in a digital network environment, including public key cryptography, digital signatures, privacy enhanced mail, and notarization.

SUMMARY OF THE INVENTION

In general, in one aspect, the invention features a method of managing digital objects in a network, the objects are stored at locations accessible in the network using a storage technique which renders the digital objects secure against unauthorized access. Pointer information which associates each digital object identifier with a pointer indicating the location of the stored digital object is also stored in the network. For each digital object validation information is stored, separately from the digital object, and is sufficient to permit a determination whether a purported instance of a digital object is identical to the original. In examples of the invention, an authorized user may have access to the validation information, using the digital object identifier, to determine whether a purported instance of a digital object is identical to the original. The validation information comprises a digital signature over the digital object.

Another general aspect of the invention concerns managing reference information about digital objects in a network. The reference information is stored for each of the digital objects. Validation information is also stored and is substantially smaller in size than the corresponding digital object. In examples of the invention, an authorized user may have access to the reference information using the unique identifier. The reference information includes information concerning at least one of the following: registration of rights in the digital object including performance of the object; accesses to and uses of digital object; the terms and conditions for use of digital objects; the ownership and transfer of rights to disseminate digital objects; links between different digital objects.

In another general aspect of the invention, which concerns the storing of the digital objects in a network, the verification information is stored separately from the digital object. In examples of this aspect of the invention, the pointer to the object (versus identifier information for the object) is stored in multiple servers on the network. The identifiers are generated in a manner to distribute the pointer information (with the unique identifier information) relatively evenly among the servers, using a hashing algorithm.

Another general aspect of the invention concerns enabling users of a network to access or perform digital objects stored in the network. There are multiple pointer servers each of which accepts identifiers of a subset of the digital objects and returns corresponding pointers to the locations of the digital objects in the network. A directory server accepts identifiers of any of the digital objects and maintains and returns a table containing the locations of the pointer servers which accept those identifiers.

Another general aspect of the invention concerns applying for registration of rights in digital objects by submitting to a registering authority an application for registration of rights including the validation information and the unique identifier of a digital object and its properties.

Another general aspect of the invention concerns enabling holders of rights in digital objects to control terms and conditions under which they are accessed or performed by users in a network. Information is stored about terms and conditions for access to and performance of each digital object. The information is made available to a user in connection with a request for access to a digital object. The user is enabled to indicate assent to the terms and conditions. Access is permitted to the user only upon the user indicating assent to the terms and conditions.

Another general aspect of the invention concerns enabling holders of rights in digital objects to control terms and conditions under which rights in the digital objects may be granted to others. Terms and conditions for the granting of rights is stored in the network. The terms and conditions are made available to potential rights holders upon request via the network. The potential rights holder and the current rights holder interact via the network to reach agreement on terms and conditions for grant of dissemination rights. Information identifying grants of such rights for digital objects on the network are stored in a recordation server on the network. This will generally be part of the reference service.

Another general aspect of the invention concerns maintaining a record of information concerning digital objects stored on a network. The digital objects are stored on the network in a manner that restricts unauthorized access to and transactions associated with the digital objects. A reference service is provided on the network, separate from the storage of the digital objects, for recording information about accesses to and transactions associated with the digital objects. Information about accesses to and transactions associated with the digital objects is recorded in the reference service. Access to the records of the reference service is permitted to authorized users.

Another general aspect of the invention relates to managing registration of claims to rights in digital objects. Copies of the digital objects are stored in a repository in a manner that enables only authorized accesses to the digital objects and permits verification that the stored digital objects have not been subjected to unauthorized alteration. At a registrar which is accessible on the network at a different network address from the repository, registration services are provided including receipt via the network of registration requests and delivery via the network of registration certifications. The objects are accessed at the repository via the network for use in providing the registration services.

Examples of the invention include the following features. Owners of rights in digital objects may deposit copies of the digital objects in the repository, via the network. There may be multiple repositories. A set of servers, accessible on the network, are provided for the purpose of generating a unique handle for each digital object. The handle for a digital object is unique both across the network and over time. A service, accessible on the network, is provided for locating the handle associated with a digital object. The handle is used to obtain a pointer to the network location of an accessible copy (by "copy" we intend a broader concept then the conventional notion of copy; see other sections of this application for explanation) of the digital object. The handle is used to obtain a pointer to the network location of information concerning obtaining authorization to use the digital object. The services are provided at multiple different locations on the network. The handles comprise unique character strings associated with the servers which generated them. A handle server, accessible on the network, provides the pointer in response to presentation of a handle. Multiple servers provide the service, each serving a portion of the handle space. Multiple handle generation servers may generate handles independently. Information concerning simple terms and conditions is stored in the repository. Information concerning non-simple terms is held in a rights management system (it may also contain the simple terms and conditions). Each of the handles is used to obtain a pointer to a rights management system in which information concerning non-simple terms is held. Hash values are computed on the handles and the hash values are distributed among multiple handle servers, each handle server having a table which associates handles with pointers.

Another general aspect of the invention features a method for providing network based regulation of claims in rights in digital objects, and, in connection with actions (e.g., registration of rights or obtaining copies for consideration) pertaining to regulation of claims in rights in the digital objects, using handles to obtain authorized access to the digital objects in the repository. Actions include registration of claims in the rights.

Another general aspect of the invention features a network-based method for managing compensation for access to digital objects and transfer of rights in digital objects. Information is stored on the network identifying the ownership of rights in digital objects. At a rights management system available on the network, requests for rights in digital objects are received. In response to the requests for rights (e.g., exclusive rights), and after successful negotiation of rights transfers, requests are issued from the rights management system to the recordation system via the network, to record transfers of rights in the digital objects.

Examples of the invention include the following features. The transfer of rights is recorded in the recordation system in a manner which is secure against alteration. The request for transfer of rights typically occurs after the owner is compensated using a network based method of compensation or other method, or a commitment has been obtained to compensate the owner of the rights using the network-based compensation method or other method.

Among the advantages of the invention are the following.

Any kind of digital object may be dealt with. Owners of digital objects may deposit them in a secure manner that both restricts access and allows for later verification that the deposit has not been altered. Detailed records of the history of deposits and of transactions related to the objects (e.g., transfers of rights) may be kept in a protected location in the system, while access to those records may be allowed to any authorized party on the network. The records may include information about the history of revisions and derivative versions of objects, and may link objects based on other relationships among them.

Thus, in combination the information and reference server (e.g., the registrar) and the repositories provide a unique capability, applicable to any digital object, to provide for protected storage in electronic storage facilities and, in a separate facility, secure maintenance of validation information needed to assure the unaltered nature of the stored object and historical information about the object. In this way, it is not necessary to store the objects at the same location as the validation information and any authorized person on the network (e.g., a court, or a government employee, or the rights holder, or a user) may have access to the validation and historical information and, if authorized, the object itself. When applied broadly to a large number and variety of rights holders and users, the system will produce a digital object infrastructure of enormous value to the conduct of business.

The digital signature, privacy enhanced messaging, and other protection mechanisms assure the integrity of the system.

The present manual paper system for mediating rights in the use of and dissemination of digital objects is replaced by a network-based system that operates rapidly, accurately, and efficiently, and will produce a freer, higher velocity market in such rights, thus greatly enhancing the value of the rights.

Corporations and private institutions may apply the invention in a variety of contexts.

The handles used to uniquely identify digital objects are designed to be extensible and expandable to accommodate virtually any number of objects over many years. The hashing mechanism provides an efficient and reliable implementation.

Other advantages and features will become apparent from the following description and from the claims.

DESCRIPTION

Figure 25:
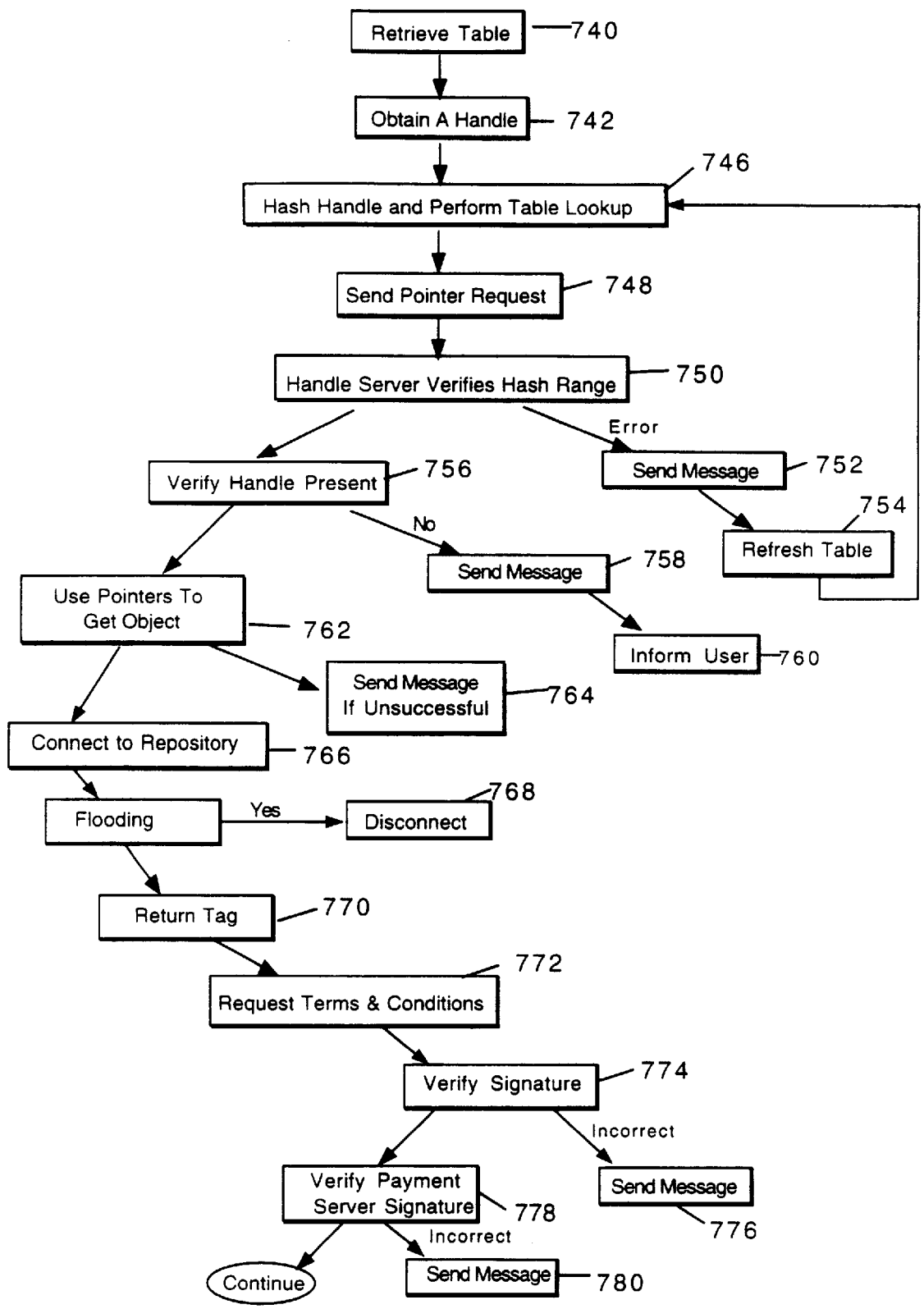
Figure 26:
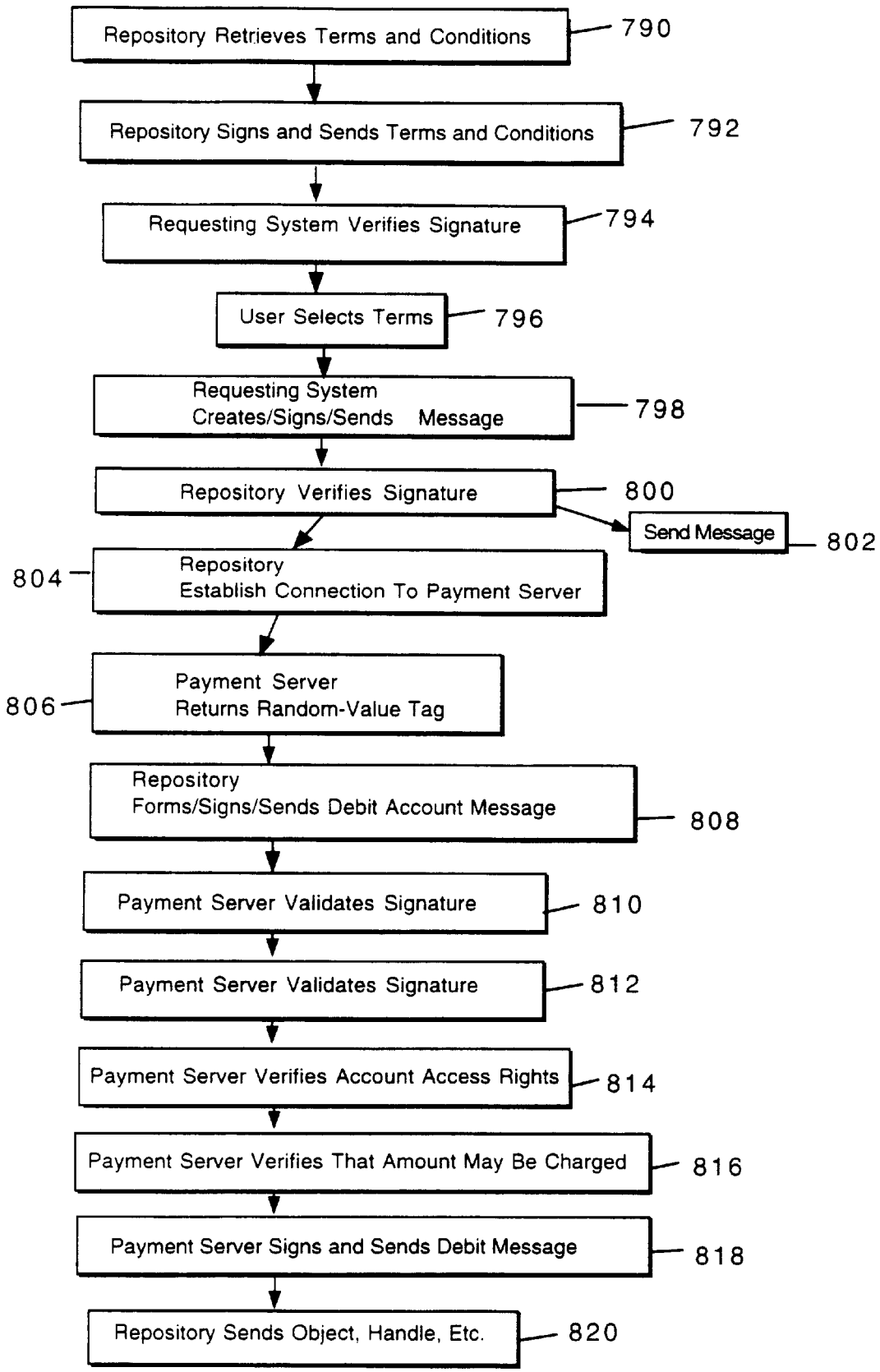
Figure 27:
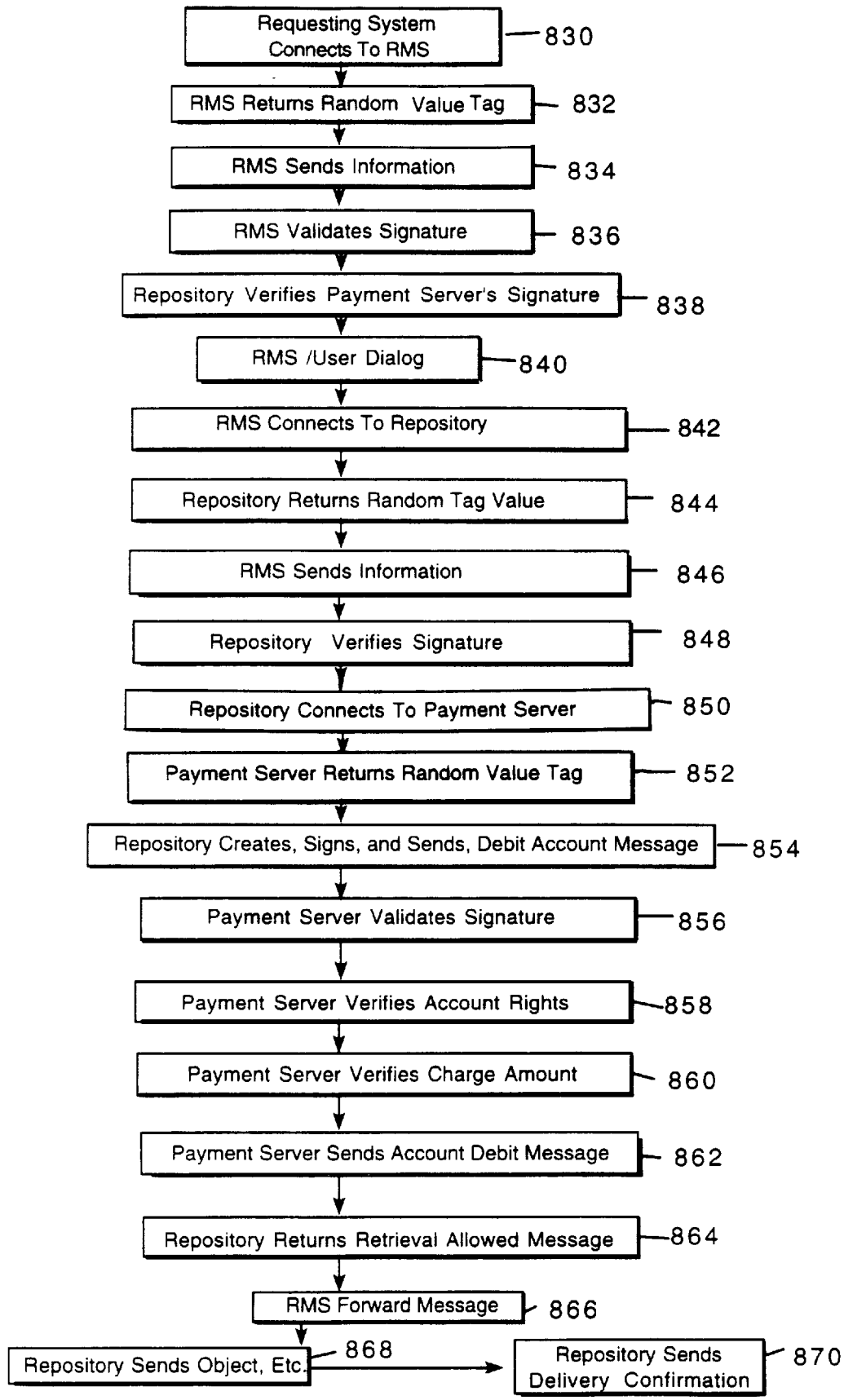

FIGS. 25, 26, and 27 are flow charts of processes of retrieving an object.

Preliminarily we define several terms which are used in the following discussion (see FIG. 1).

A "repository" 1002 is a digital storage system into which digital objects 1004 may be placed and retained for possible subsequent retrieval. The repository may contain other related information 1006 as well as management systems 1008. Where appropriate, such information may be provided to an "information and reference server" 1010. The result of retrieving a digital object from a repository may be a performance of the digital object (e.g., execution of a program) or the digital object itself (e.g., the program). This is important in the case of digital objects which are only intended to be performed by users (e.g., a video game) rather than making the object itself available. A performance of a digital object may be stored as a new digital object and there may be separate terms and conditions associated with it.

Digital objects are "typed". Thus one can tell in a concatenated sequence of digital objects what kind of digital object is present (e.g., the "object itself" or a "performance of the object") and where each digital object starts and ends. One simple way to accomplish this is to include a type field as the first part of the sequence of binary digits which contains the necessary information. It could also be externally maintained (e.g., in a properties record, described below).

A digital object may contain other digital objects in the sequence of binary digits following its handle. A user will be able to identify these contained objects from the type fields of those digital objects contained therein.

Each digital object has a "handle", a concise unique identifier for a digital object used for storage and retrieval operations and other repository functions.

A digital object may have associated with it, in the repository or elsewhere, as part of the related information 1006, a "properties record" 1014 which is a set of database entries that describe properties of the digital object.

A digital object also may have associated with it, in the repository or elsewhere, an associated "transaction record" 1016 which records transactions involving the digital object.

The properties record may contain entries such as the identity of a rights management system 1018 (i.e., the system that has control over transfers of and compensation for rights in that object), the handle 1012 for that object, the originator of the object 1020, the name of the object (if any) 1022, a description of any work or other information or material incorporated in the object 1024, the time and date of deposit 1026, format information 1028, and stated terms and conditions for access and usage of the object 1030. The terms and conditions in the properties record may allow the user to select which type of action to allow (e.g., retrieve object or perform object). The user may be allowed to negotiate type of action with the RMS. The user also may be given no choice of options. In many retrieval cases, the user will not know if an option exists.

The transaction record may contain entries such as the time and date of each request for retrieval 1032, the identity of the requesting party 1034, the handle 1012 for the object, and the applicable terms and conditions including amount and method of payment 1036.

The properties record, the transaction record, and the digital object all are normally accessible using the handle.

The "rights management system" 1038 is a system used to negotiate access rights and other rights not otherwise specified in the properties record. It retains information about transactions, and communicates information about approved transactions and associated terms and conditions to the repository. Where authorized, it also informs the information and reference server about transactions involving rights management for recordation purposes.

The information and reference server 1010 receives information from the repository and the rights management system. It retains a copy of the properties record for each digital object, a digital signature or other "fingerprint" of the digital object (the digital signature and other fingerprint is typically considerably smaller than the object itself) suitable for verification purposes and a temporal history list of related objects. In retains a history of chain of title 1052 to digital objects. The information and reference server is intended to be used for browsing, verification purposes, and to alert users to changes in the system. It some implementations it can be used as a registration and recordation server for copyright and other purposes. The server may be part of a governmental department, or of a private service operation. The information and reference server typically would not retain complete digital objects for storage and retrieval purposes.

The network would also be accessible to a wide variety of rights holders 10 (e.g., authors, owners, holders of exclusive rights). The rights holders may have access, when authorized, to the information and reference server, the repositories and the rights management system. The information and reference server, the repositories, and the rights management system are also potentially accessible by network users 14, who may wish to obtain, use, modify, transmit, perform, and enhance selected digital objects, or the results of operations performed by or on digital objects. The medium of the network (e.g., the cables, airwaves, public switched telephone network) is not shown in the figure; but the network medium could be organized as a single local area network, a wide area network, or a broader network structure (e.g., the Internet).

The overall system also includes a handle management system 1042 comprising multiple servers which provide handle server directory services, handle-to-pointer translation services (called "handle servers"), and handle generation services; payment servers 1044 which provide payment authorization services; and a wide variety of other possible servers 1046 including those which would provide intermediary services between rights holders and users, on one hand, and other servers on the other hand. For example a server might provide a service of receiving a conventional bibliographic citation to a journal article and communicating with an appropriate handle server to identify the location of the article on the network. That service and others could be provided as commercial services. It should also be clear that services can be provided on a widely distributed basis by multiple similar servers at different locations on the network, or by single centralized servers. Furthermore, not all of the digital objects which may exist on the network need be covered by the servers of FIG. 1. Only when rights holders choose to subject their objects to the system would the services need to be provided.

Figure 1:
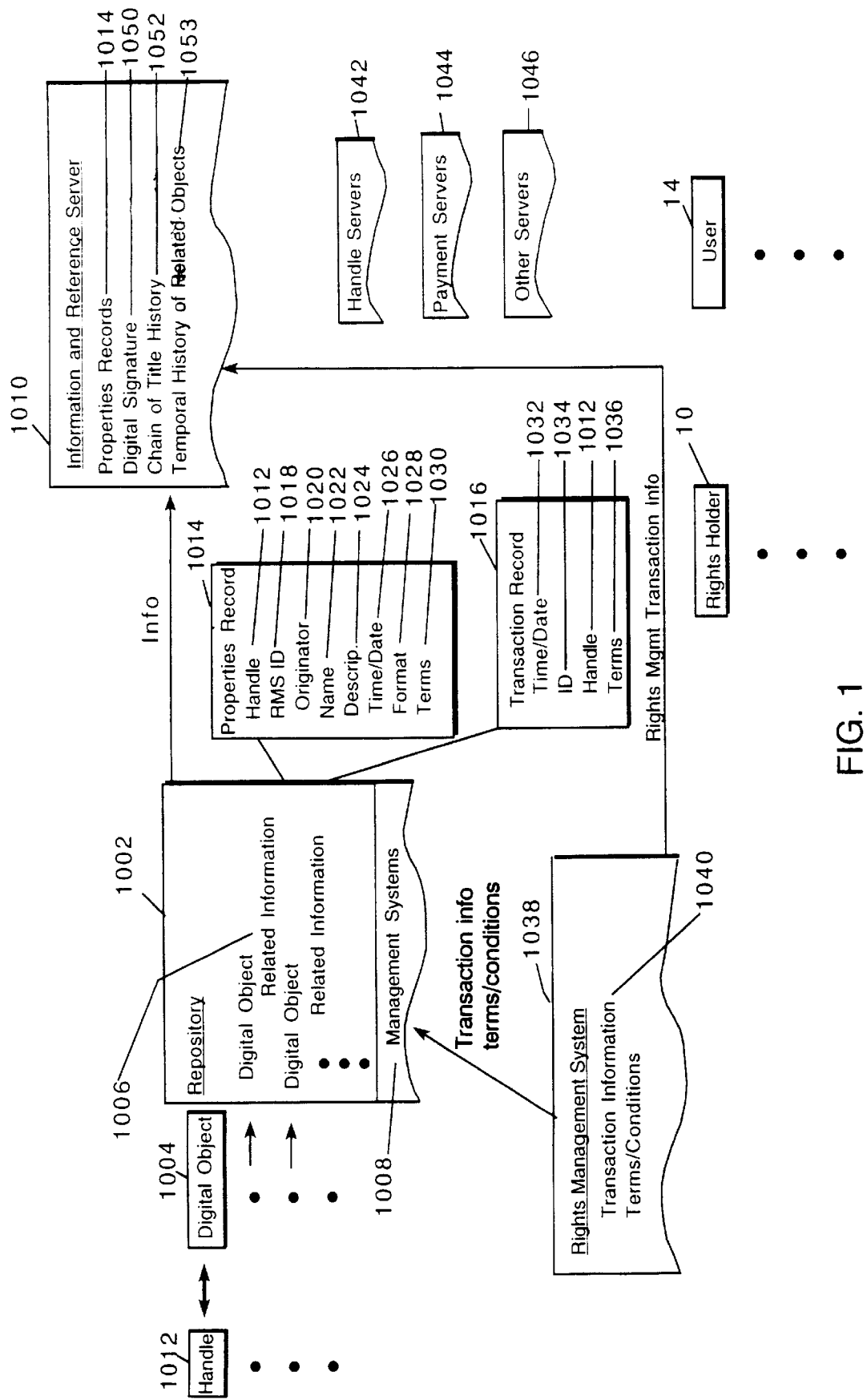
FIG. 1 is a block diagram of a system for managing digital objects.

In what follows, we provide examples of operations which may be conducted with assistance of the servers and services of the kind shown in FIG. 1. The operations include registration of rights, recordation of transfers of rights, deposit of objects in repositories, generation and use of handles, arranging compensation for use of objects and for licensing and transfer of rights (e.g., exclusive rights) in objects (under simple or non-simple terms), use of digital signature and other protective mechanisms to insure the integrity of the transactions within the system, management of rights, and obtaining objects from repositories.

Overview of an Example System

Figure 2:
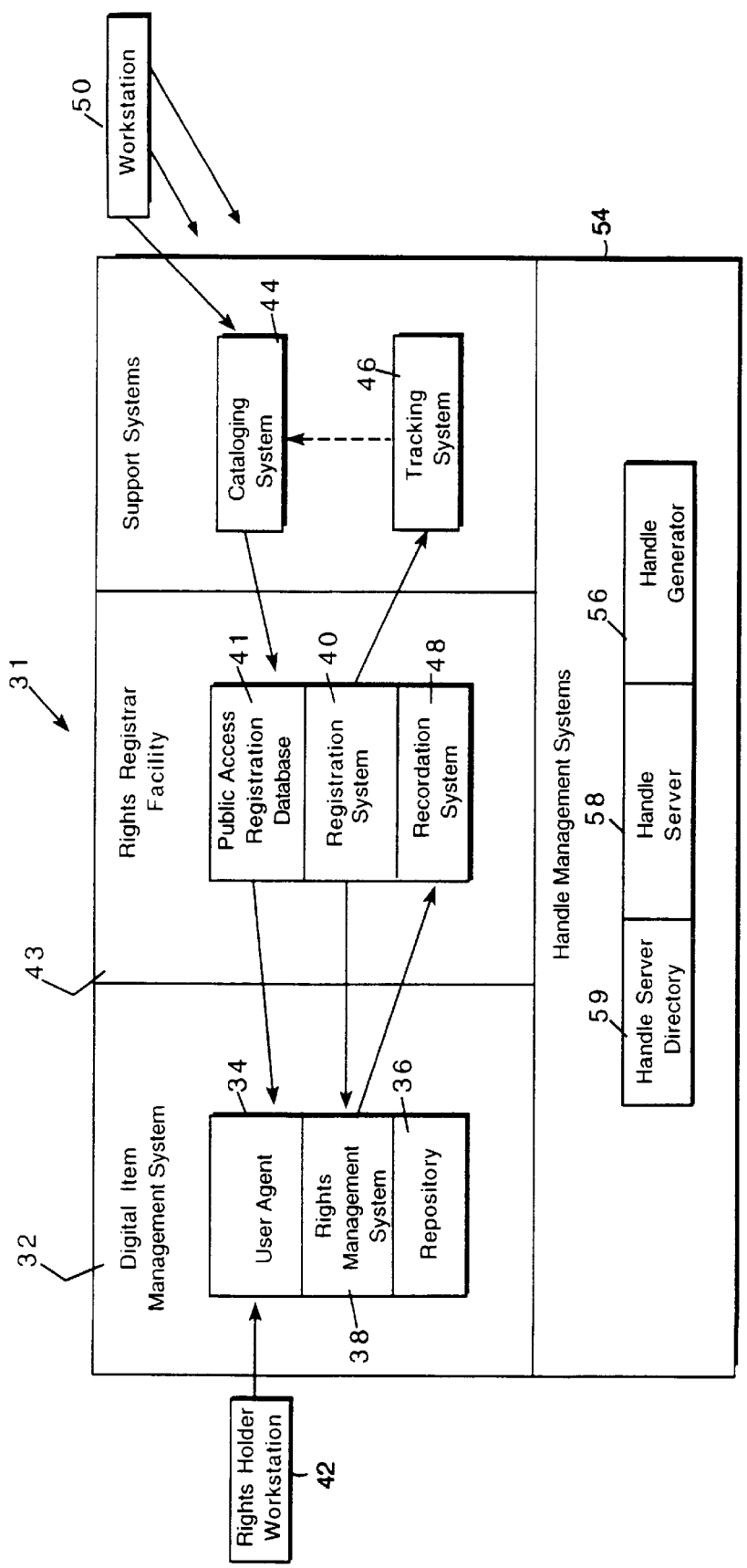
FIG. 2 is a block diagram of an example of a system for registration of rights, recordation of transfers of rights, and rights management.

As seen in FIG. 2, an example system 31 includes a digital object management system 32 which includes hardware and software to create and store digital objects and manage rights to the objects. In the system, a user agent (UA) 34 provides a user interface for interactions with other elements of the system. The UA is in the form of software running on a workstation. The UA may be used to initiate storage of an object within a repository 36 by passing the object to the repository or by transmitting information which the repository can use to retrieve the document. The UA also interacts with the repository to initiate a rights registration application process.

The UA also interacts with a rights management system (RMS) 38 to initiate recordation of transfers of rights. The UA interacts with the registration system 40 directly (or indirectly through the repository) to initiate the rights registration application process and with the public access registration database 41 to allow users to browse and search for information about registered rights. System 40 and database 41 are part of a rights registrar facility (and serve as an example of the information and reference server of FIG. 1).

Rights holders may prepare digital objects for entry into the system using a workstation and file server 42 which transfers objects in any of several well known formats (e.g., ASCII or Group IV facsimile) to the workstation hosting the UA for rights registration application processing.

The RMS 38 provides information about terms and conditions for use of digital objects and enters into negotiations with users for rights. The RMS interfaces with the information and reference server to obtain relevant reference information. The RMS also controls conditions for access to objects stored in repositories. The RMS may delegate to the repositories the responsibility to handle simple terms and conditions. The repository 36 holds copies of digital objects in a secure and verifiable manner and controls access to the objects. The repository also sends copies of digital objects to other systems when instructed to do so by an RMS.

In the rights registrar facility 43, the public access registration database 41 will provide access to information about registered rights and provides a read-only interface to a cataloging system 44. The registration system 40 holds digitally submitted rights registration applications during application processing. The application information is submitted to a tracking system 46 for tracking purposes (e.g., for tracking examination or status) when the digitally submitted application is received. The recordation system 48 stores and provides information about transfers of rights (and other information pertaining to rights and interests. The recordation and registration systems in this example form part of a more general information and reference service.

The cataloging system 46 stores information about registered rights and provides the basis for public (network) access to registration information.

A registrar workstation 50 allows a registrar user to view and print rights registration applications and accompanying documents and recordation information and accompanying documents. The workstation interacts with the registration system to obtain registration application information, with the rights management systems and repositories to obtain digital objects whose rights are being registered, and with the recordation system to obtain recordation information and associated documents.

The handle management systems 54 are used to find the location of digital objects and the locations of each object's associated RMS. A handle for an object may be associated with zero or more object pointers. Object pointers contain location information for locating digital objects and/or associated RMSs. Each object may have an associated RMS which manages rights in the object on behalf of the rights holders.

Handle generators 56 in the handle management systems 54 create the globally unique handles.

Handle servers 58 process handle query requests. If the handle which is the subject of the query is found by a handle server, the object pointers associated with the handle are returned to the requesting client. A handle server accepts a handle as input and returns a list of pointers associated with the handle, where each pointer={domain name of storage system (repository), domain name of RMS}. The domain name of the RMS may be null, e.g., if there are no terms and conditions stored in the RMS. The domain name of the storage system may be null if the rights stored in the RMS do not include obtaining a copy of the object, or if the rights apply to a "physical" object.

The handle server directory 59 allows users to find the correct handle server for processing a given handle. Users which obtain handles from servers associate them with digital objects. The handle server directory 59 distributes handles to handle servers based upon a hash of handles. The handle server directory provides a list of domain names of handle servers and identifies the set of hash values of handles which each of the handle servers can map to pointers. Each country has its own collection of handle servers and handle server directories.

Public Key and Digital Signature Technology

There are several security issues that the system must solve. The registration system must be able to verify the identity of the rights registration applicant. This is required since the applicant will charge the registration to an account, and it is also required for legal reasons.

When an object is transmitted to either the registration system or the repository, the recipient system must be able to determine that the object was not altered in any way. When an object is stored on a repository, the rights holder of the object must also be able to determine that the object was not altered by the repository in any way. Similarly, when an RMS tells a repository to send a copy to an object requester, the repository must be able to verify that a valid RMS is sending the command to the repository. When any correspondence is sent to the rights registration applicant from the registration system, the applicant must be able to determine that the registration system was truly the source. As objects and other information are transmitted between the various system components, the privacy of the information must be ensured.

The system uses available public key and digital signature technology to handle privacy and authentication in the system as follows.

In conventional cryptography, a mathematical function and a secret key are shared by parties who wish to communicate confidentially. Each message to be sent is encrypted using the function and key, and the recipients decrypt it using the same function and key.

In conventional cryptography the keys must be kept secret and must be distributed by secure means. The notions of two Stanford University researchers, Martin Hellman and Whitefield Diffie, opened up a new way of thinking about key management. One key could be made public (e.g. the one used for encryption) and the other key would be kept private. Anyone knowing the public part of a pair of keys could use it to prepare a message which would remain confidential until the person knowing the private key used it to decrypt the message. The public keys could be listed in public directories since knowing them did not help anyone decrypt messages encrypted using the public key.

Three researchers at MIT, Rivest, Shamir and Adelman, later developed a pair of functions meeting the requirements specified by Diffie and Hellman. These functions are now known as the RSA algorithms. There are also other known ways to implement public key algorithms.

Since either key of a public key cryptography pair can be used to perform the initial encryption, an interesting effect can be achieved by using the secret key of the pair to encrypt messages to be sent. Anyone with access to the public key can decrypt the message and on doing so successfully, knows that the message must have been sent by the person holding the corresponding secret key. This use of the secret key acts like a signature, since the decryption only works with the matching public key. If the public key for the sender is stored in a public directory, any recipient can verify the identity of the sender.

Figure 3:
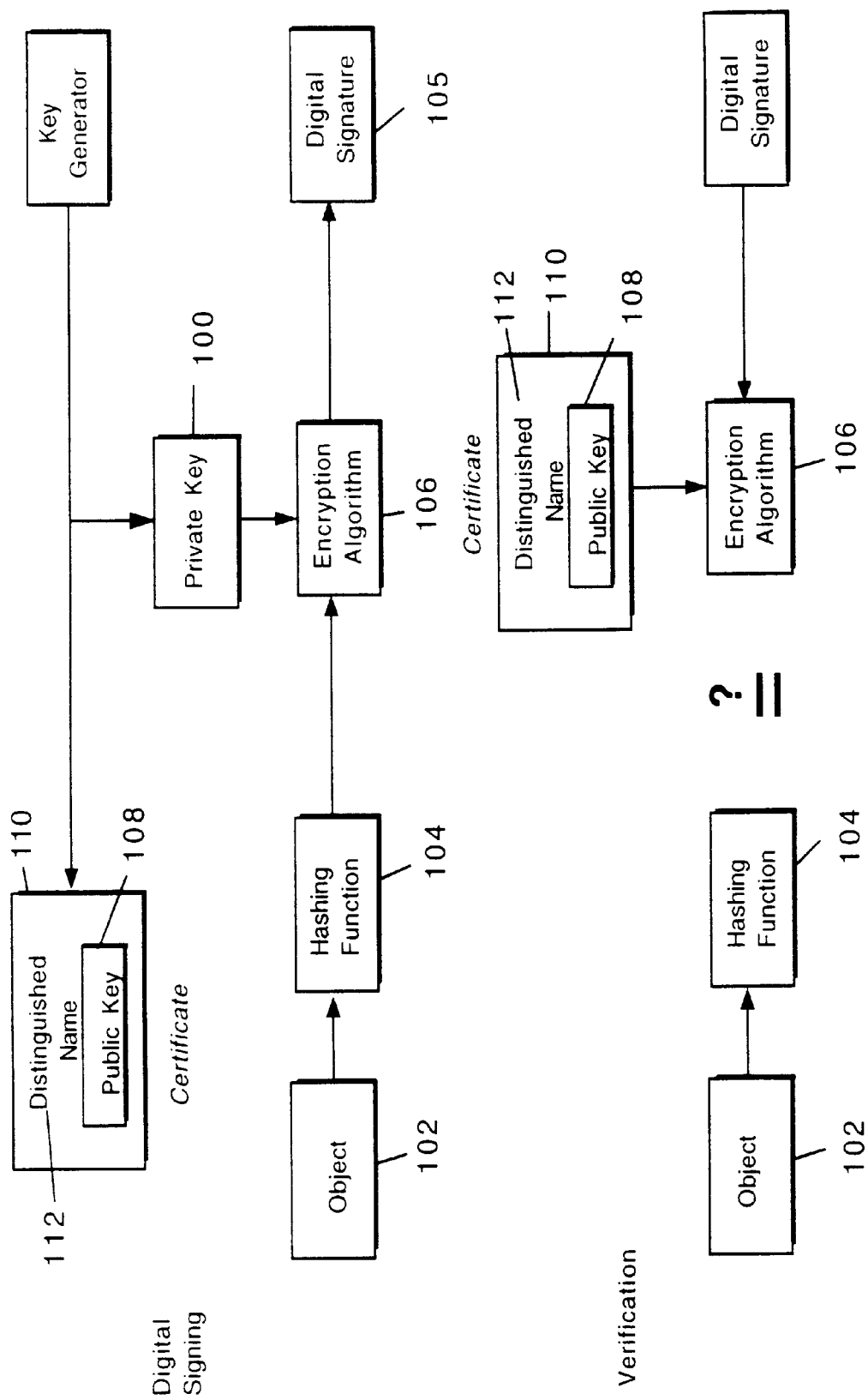
FIG. 3 is a block diagram of digital signing and verification processes.
Figure 4:
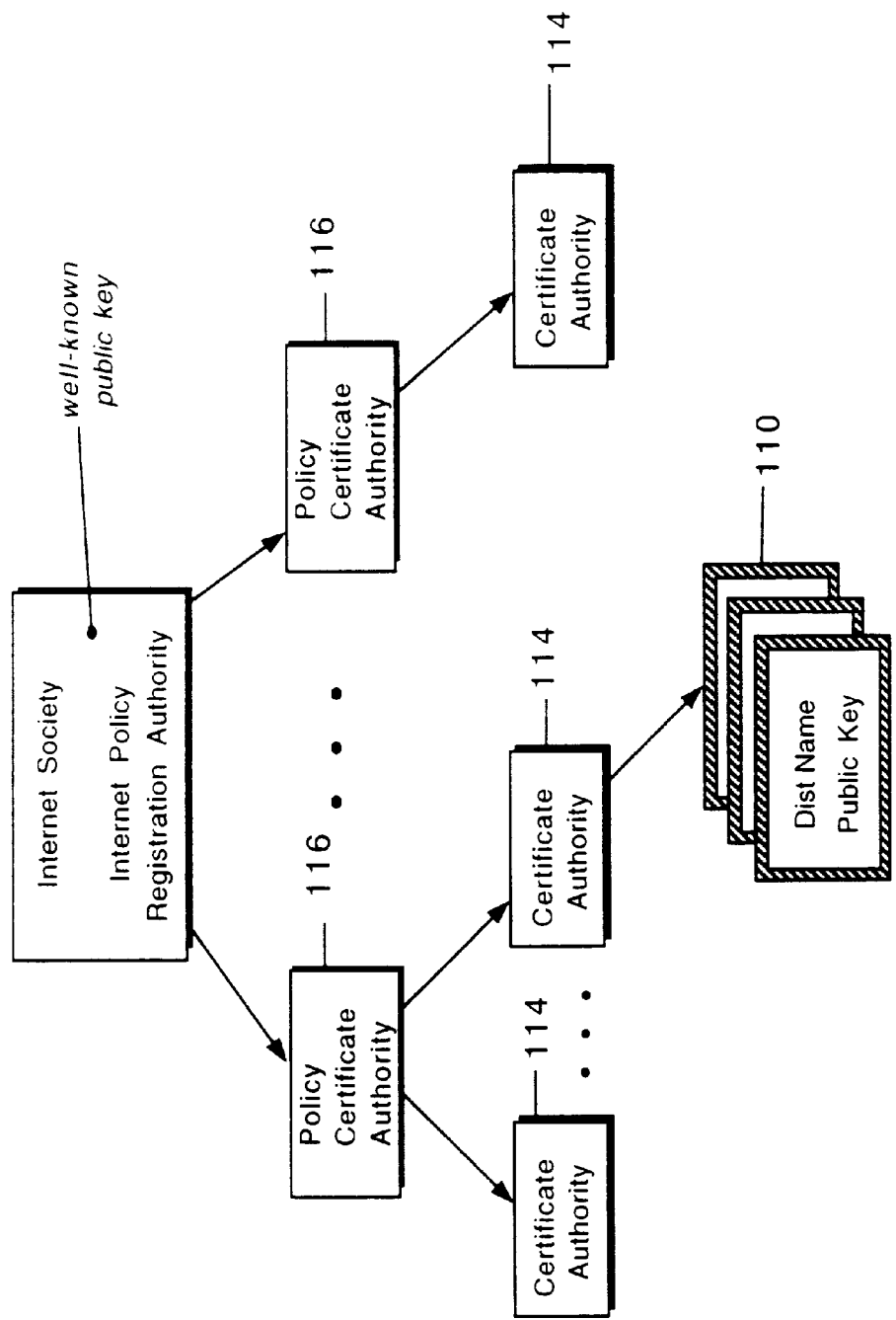
FIG. 4 is a block diagram of a public key distribution arrangement.

As shown in FIG. 3, the private key 100 can also be used to prove that an object 102 has not been altered by anyone after the object's rights holder (e.g., an author) has fixed the representation of the object. If the author performs a hash 104 over all of the object's bits, and then encrypts 106 the hash value with his secret key 100 to produce a digital signature 105, a recipient can decrypt the hash value, rehash the original object and compare the two hash values to ensure that the object has not been altered.

One problem that must still be addressed is knowing whether a public key 108 found in a directory for a given correspondent is valid or a bogus key inserted by a malicious person. One way to deal with this is to create certificates 110 containing the name 112 of the owner of the public key and the public key 108 itself. This certificate is signed with the private key of a well-known certificate signing authority 114, shown in FIG. 6. The public key of the signing authority is also published in a certificate which is signed by a higher-level signing authority 116. In essence, a hierarchy of certificate authorities has been created.

In order to make an object be private in an efficient manner, a combination of public key cryptography and conventional private key cryptography is used. Since public key cryptographic algorithms require a substantial amount of computing power, an object will initially be encrypted with a secret key algorithm, such as DES, which is computationally more efficient. The DES private key will then be encrypted with the public key of the recipient. This encrypted DES key will be sent to the recipient, along with the encrypted object.

Many of the object and information transfers performed in the system are provided by Privacy Enhanced Mail (PEM,) which was developed by Trusted Information Systems of Glenwood, Md. The PEM system (and other similar available systems) can provide message privacy and correspondent authentication. There are other systems Other messages will be sent between system components via direct connections (e.g., "TCP/IP"). The TISPEM library, developed by RSA, is used to provide message privacy and correspondent authentication.

Object Handles

Handles should be globally unique across the network and over time; should be essentially permanent, since rights on an object may last many years; should not have any location information encoded in the identifier's namespace, since an object may be located at multiple and changing locations over time; the identifier's namespace must be variable and unrestricted, since the number of digital objects created may be expected to increase; once a user acquires an object's identifier, he should be able use the handle to ascertain the current location of the object; multiple authorities should be able to generate the identifiers.

In addition, the following constraints on the use of an object handle are preferred: users of an object do not need to know its location, only its identifier; objects may be moved from one storage facility to another without affecting users; users should be able to choose object providers based upon the terms and conditions associated with an object, including its costs.

Figure 5:
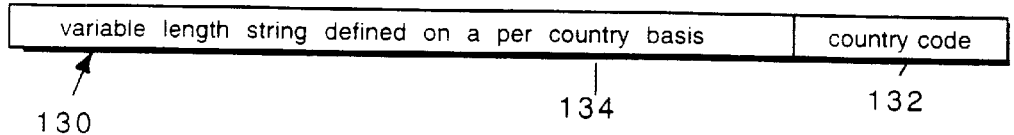
FIGS. 5 and 6 are diagrams of handles.

The authorization and rules for creating a handle are determined on a country-by-country basis. As seen in FIG. 5, handles are printable strings 130, having a country code 132 appended to a variable length string defined on a per country basis 134.

Figure 6:
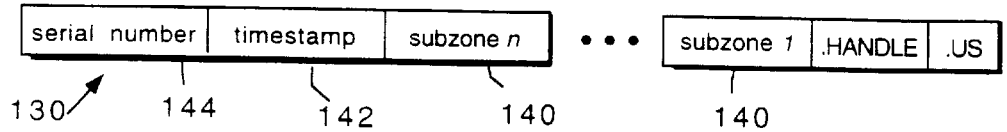

Within the United States, the variable length string will be generated in a form similar to a domain name within the Internet, FIG. 6. Authority zones will be established, and each zone authority will be able to assign handles directly or create subzone 140 authorities. A time stamp 142 and serial number 144 are used to create a unique identifier within an authority zone.

Handle generators create new handles on demand of object rights holders who wish to have handles assigned to objects.

When an object is deposited in a repository, the repository contains a copy of the object plus identification of certain simple terms and conditions for a obtaining a copy of the object and using it. The rights management system contains non-simple (i.e., requiring additional negotiation) terms and conditions for obtaining a digital object and using it, and could also contain simple terms. The pointer to the repository may be null if the object is not available on-line. Certain objects may be required to be persistent for legal and other reasons. The pointer to the rights management system may be null if only simple terms and conditions contained in the repository (or null terms and conditions) govern the use of the object.

Handle servers have the following characteristics: a handle server holds pointers associated with a subset of all handles; handles are assigned to handle servers based upon hash values computed on the handles; handle servers are assigned ranges of hash values; the set of all hash values is partitioned among the set of all handle servers. This leads to a highly efficient and reliable mechanism for locating objects and from handles. Other less efficient or less reliable methods could also be used. Handle servers may be configured to broadcast requests for handles to other handles servers, further enhancing the reliability and effectiveness of the system.

Figure 7:
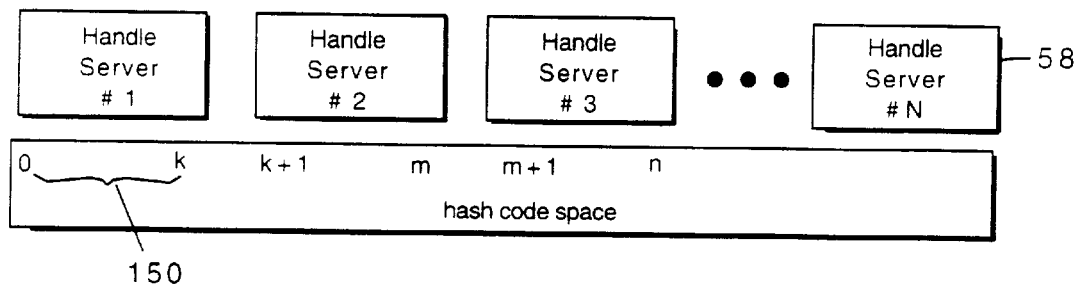
FIG. 7 is a diagram of hash code space.

The handle server directory 59 holds a table 149 which associates hash ranges 150 with domain names of handle servers 58 (FIG. 7).

Obtaining Pointers from a Handle

Figure 8:
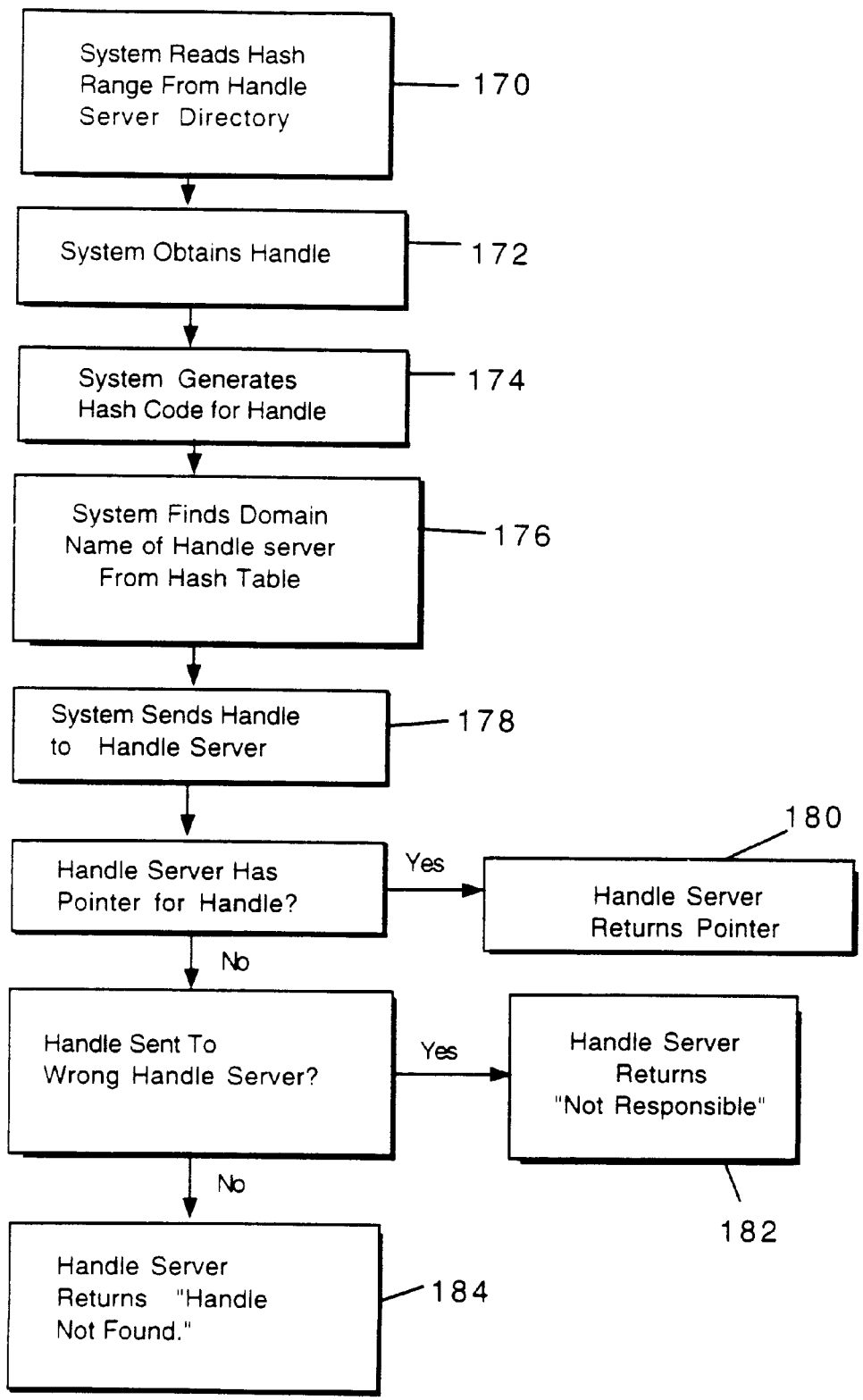
FIG. 8 is a flow chart of handle processing.

Given a handle, the following steps, shown in FIG. 8, are followed to obtain a set of pointers associated with the handle.

In a first step 170, a client system downloads the table that associates hash ranges with handle server domain names from the handle server directory for future use. The client also can omit this step if it has previously stored the table; frequent changes in the table may necessitate doing this every time. In a later step 172, assume the system obtains a handle for which pointers are desired. The system then generates the hash code for the handle using a predetermined hashing algorithm (step 174) and consults the hash range/handle-server-domain-name table to determine the domain name of the appropriate handle server (step 176). The system subsequently sends the handle to the handle server as part of a request pointer information UDP packet (step 178).

The handle server then returns its response to the requesting system. If the handle server found the pointers, a list of pointers is returned (step 180). This could include pointers to use one or more repositories and one or more RMS's. If the handle was sent to the wrong handle server, it returns a not-responsible-for-handle message (step 182). In this case, the client system should download the hash range/handle-server-domain-name table from the handle server directory again and attempt the mapping again. The requester will determine how many times to try before giving up (and this same approach is used in other similar situations described below).

If the request was sent to the correct handle server, but the requested handle could not be found, the handle server returns a handle-not-found message (step 184).

Overview of Application for Rights Registration

There are two mechanisms used to register rights: an applicant may apply for a rights registration on an object which is located on his own system 42 or on an object which has been stored in a repository 36.

In order to submit and process a rights registration application the following general steps (described in more detail later) must occur.

Figure 9:
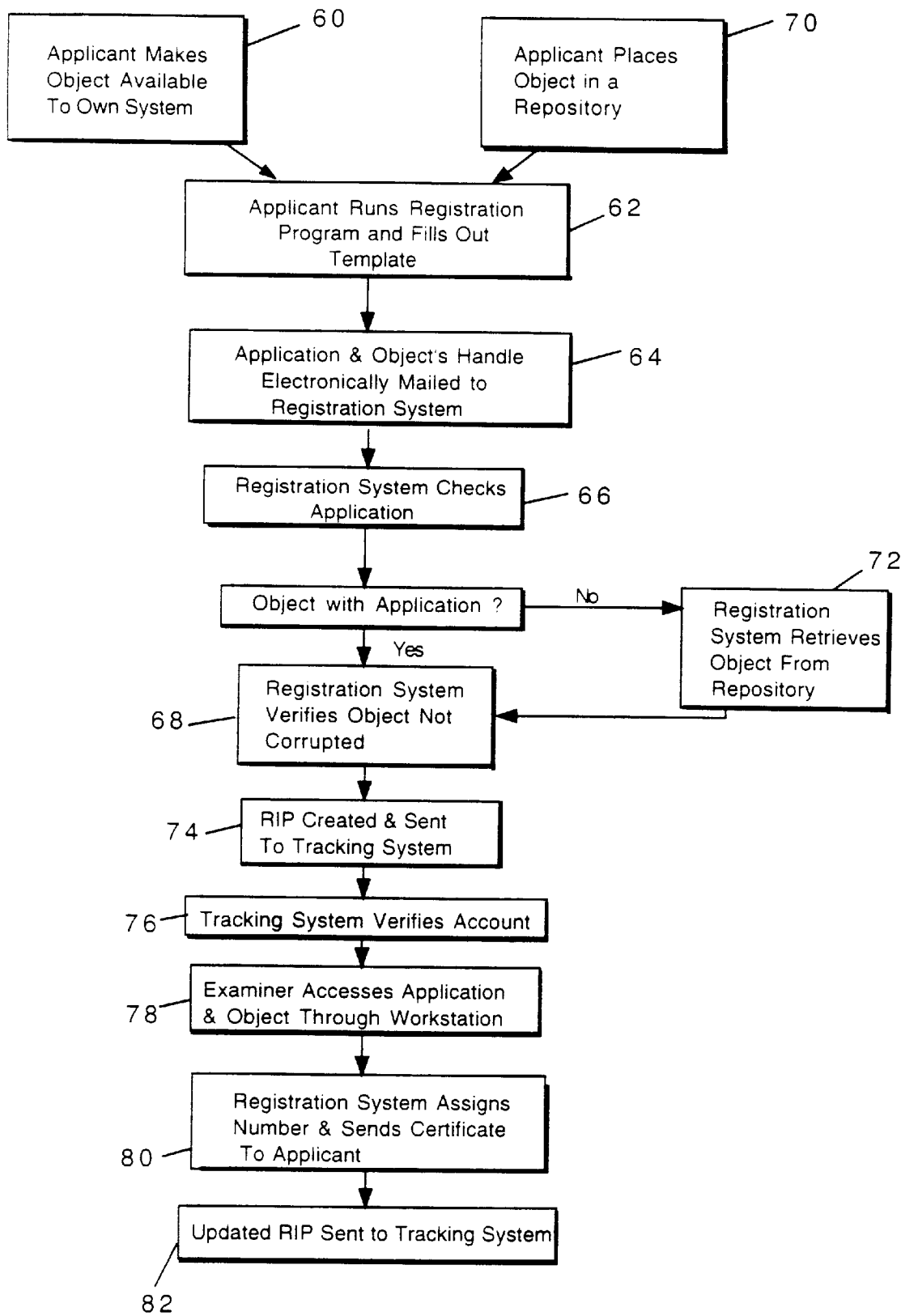
FIG. 9 is a flow chart of a process for applying for rights registration.
Figure 10:
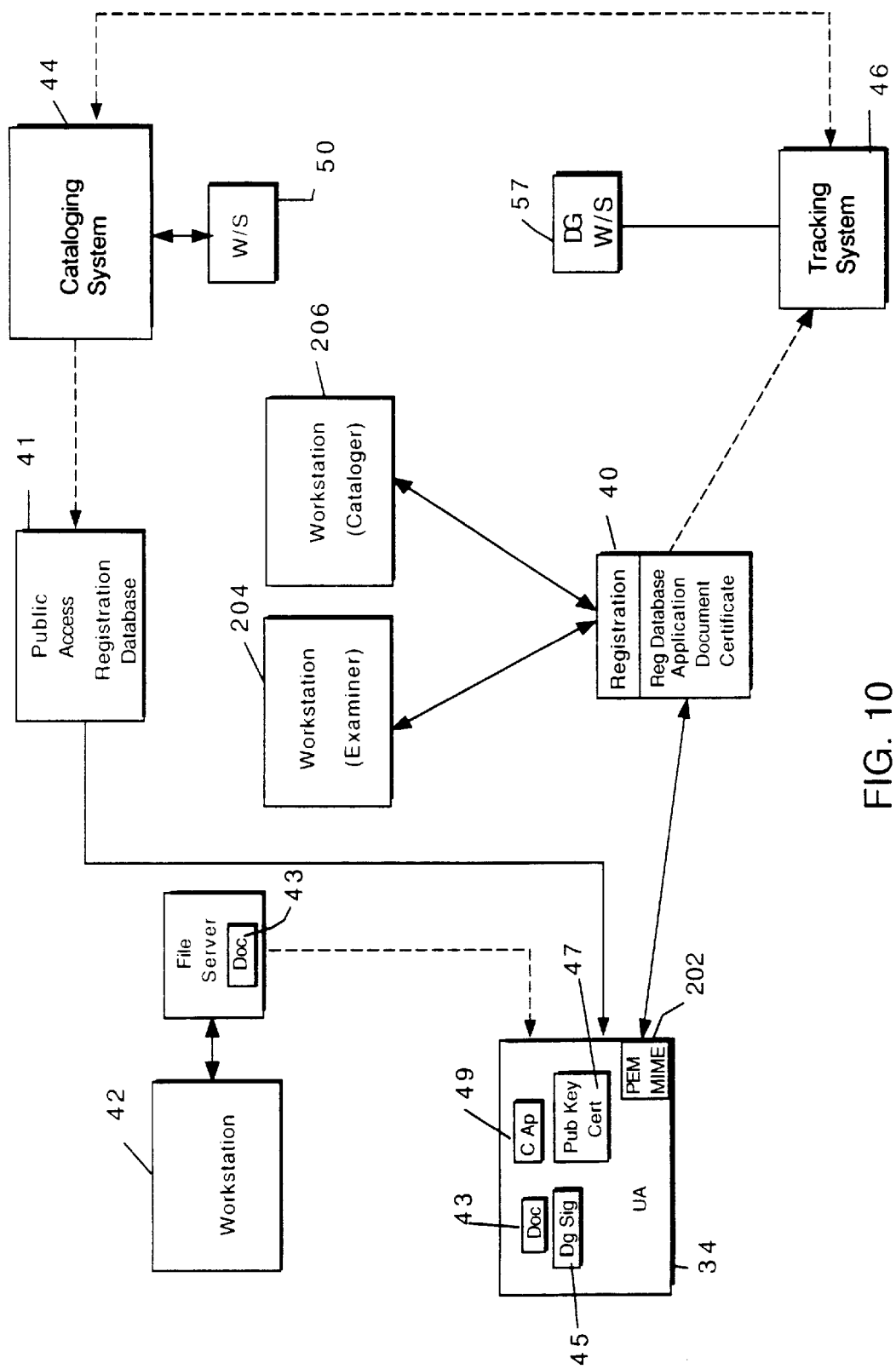
FIG. 10 is a block diagram of portions of the system.
Figure 11:
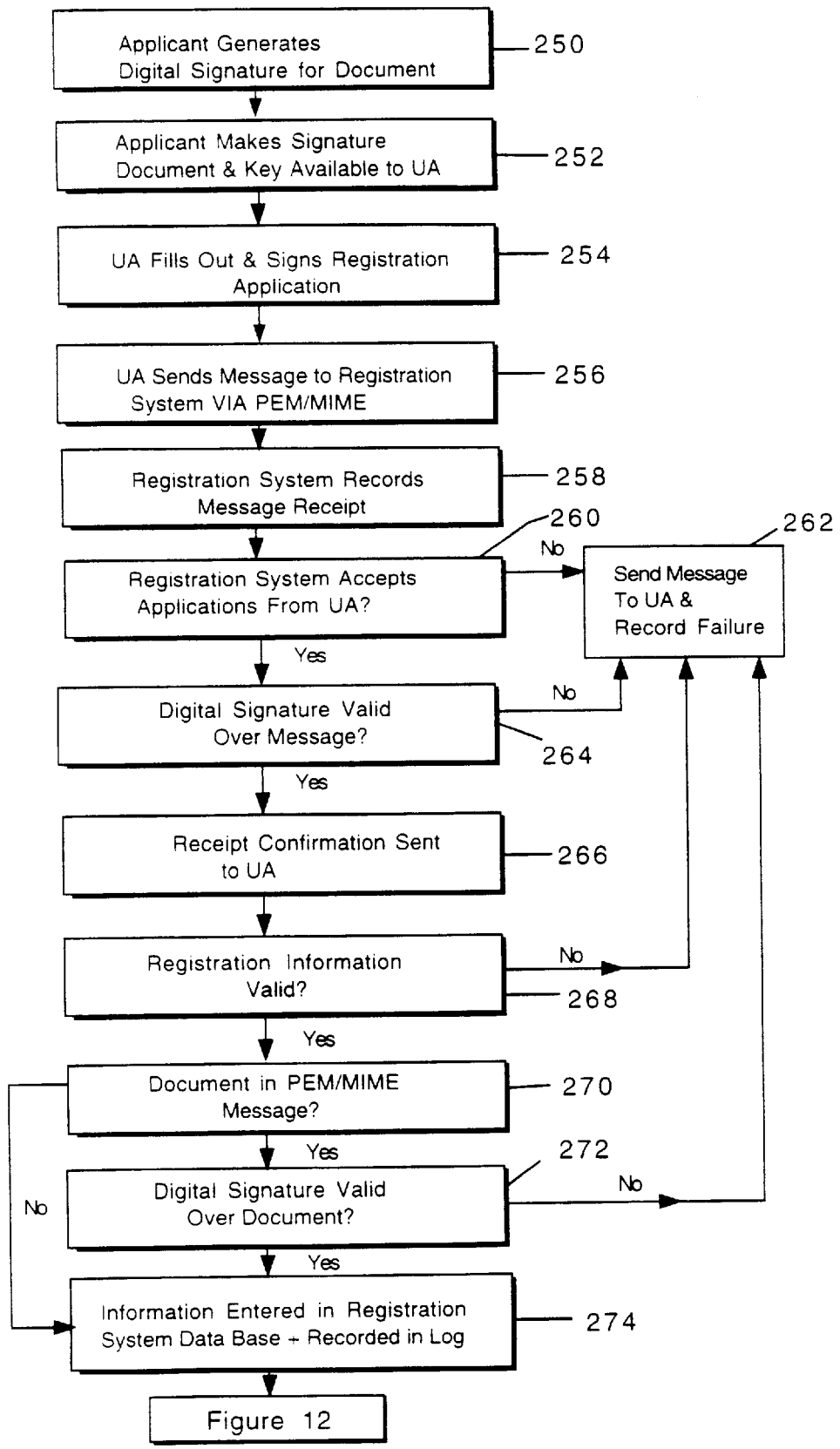
FIGS. 11 through 13 are flow charts of a registration process.
Figure 12:
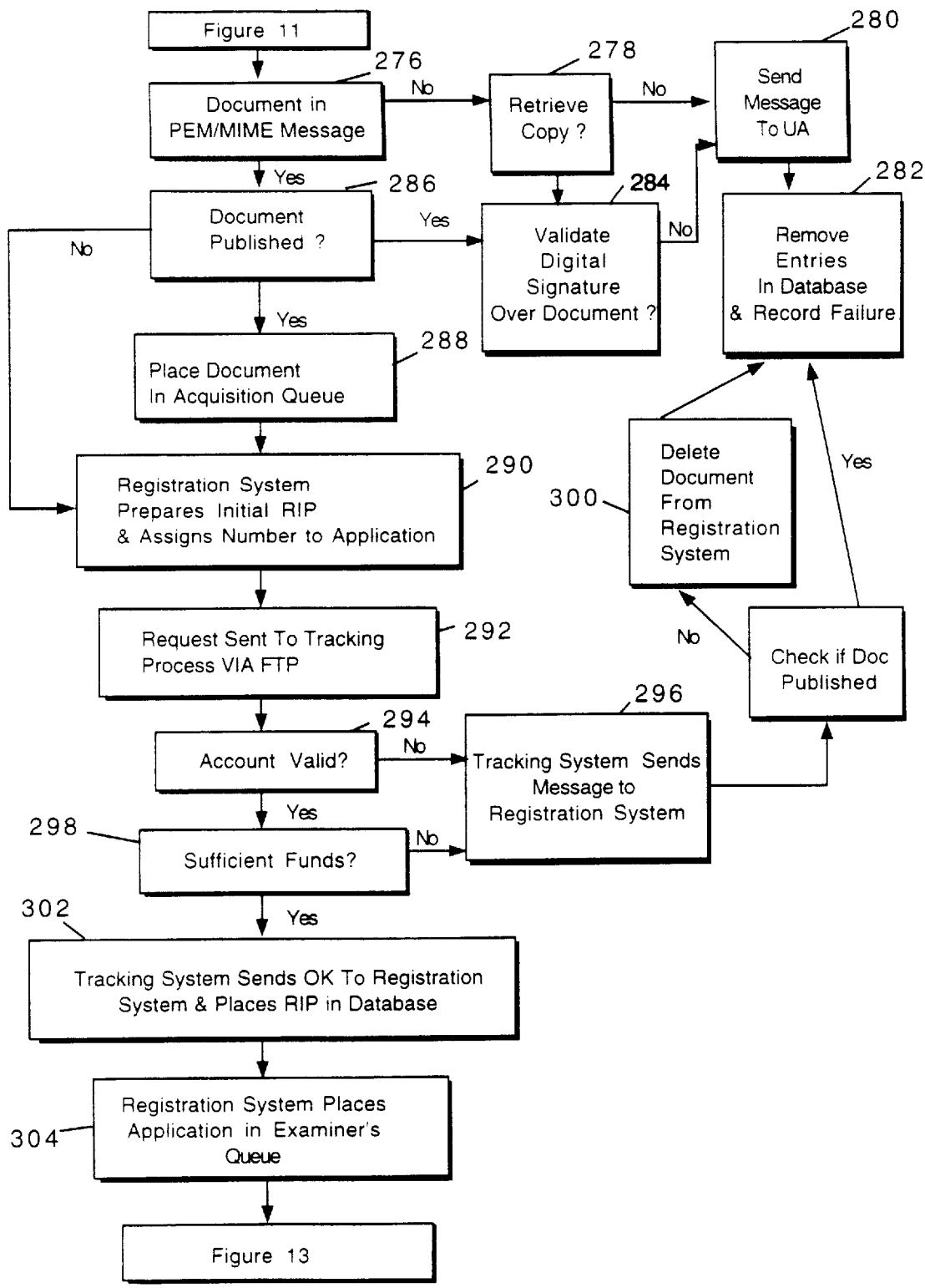
Figure 13:
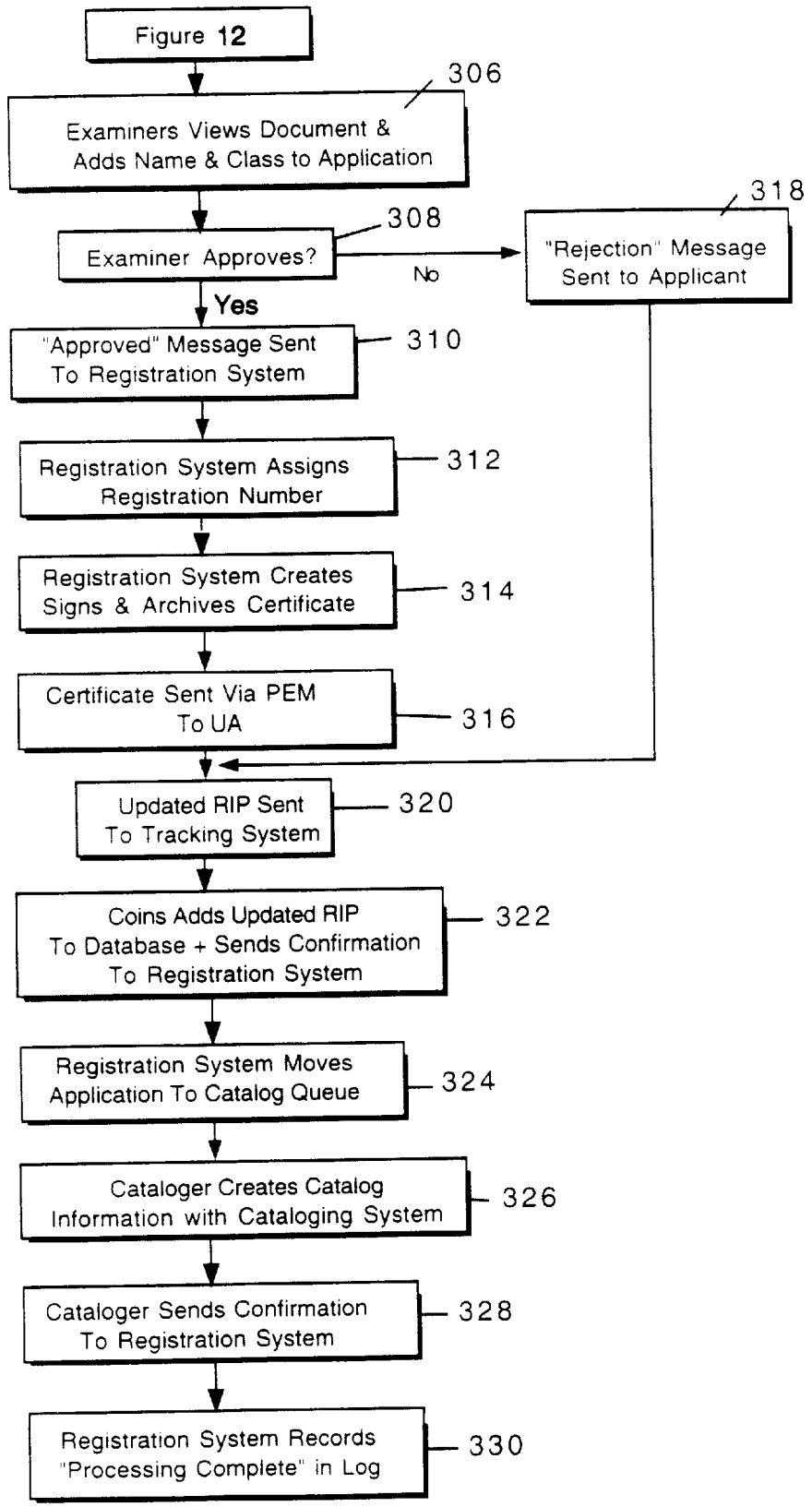
Figure 14:
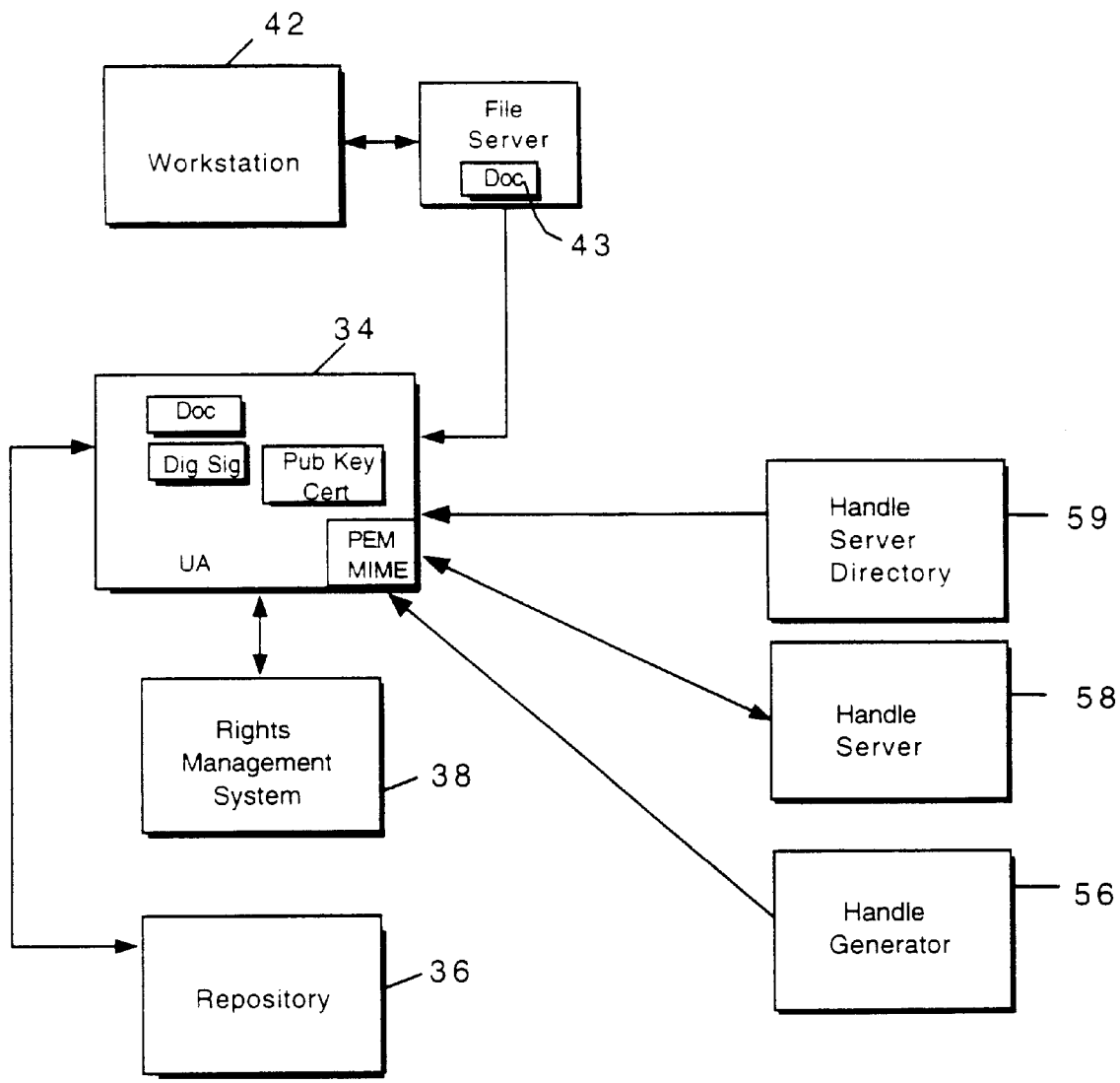
FIG. 14 is a block diagram of portions of the system.
Figure 15:
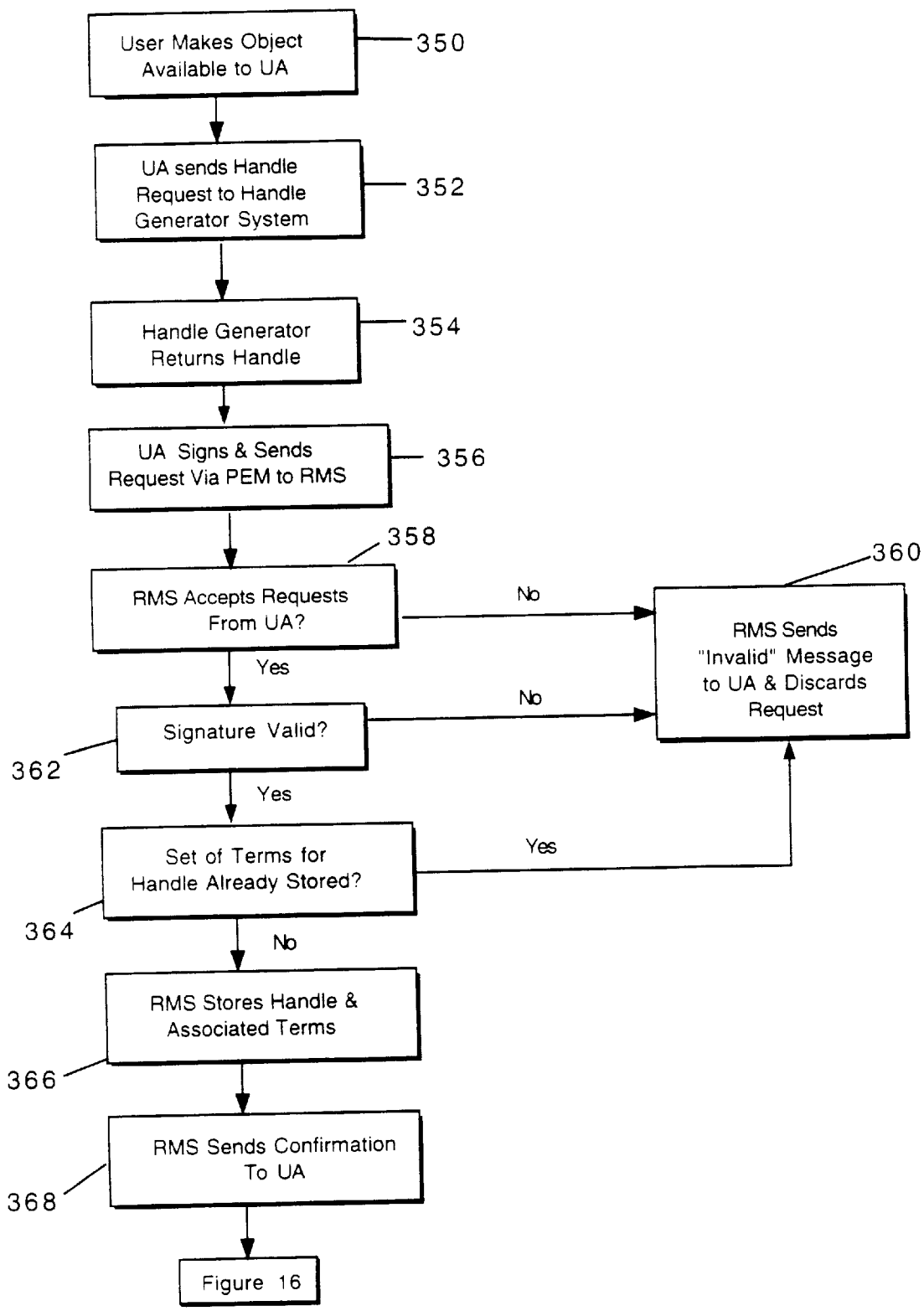
FIGS. 15 through 17 are flow charts of a process of depositing an object in a repository.
Figure 16:
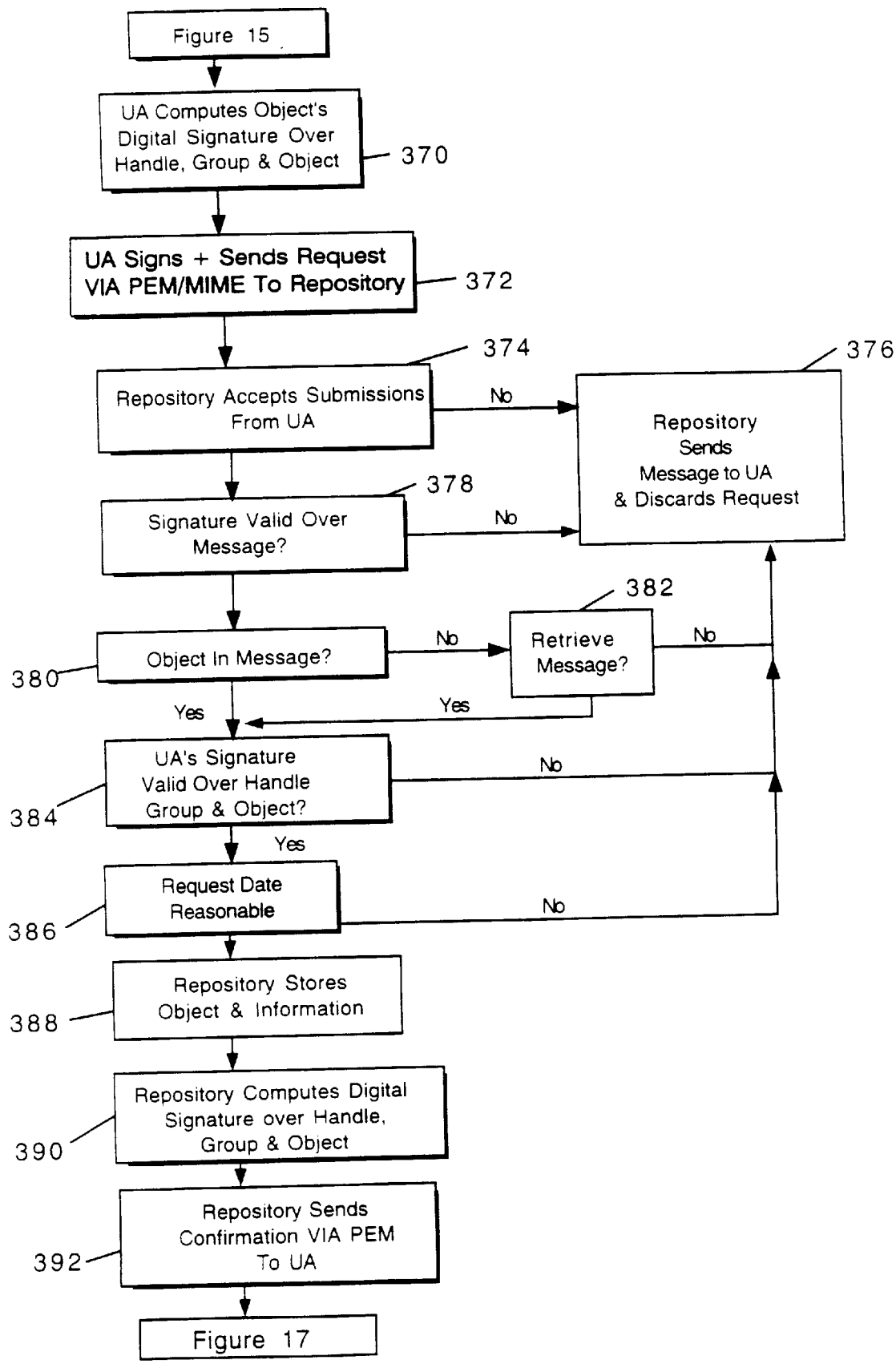
Figure 17:
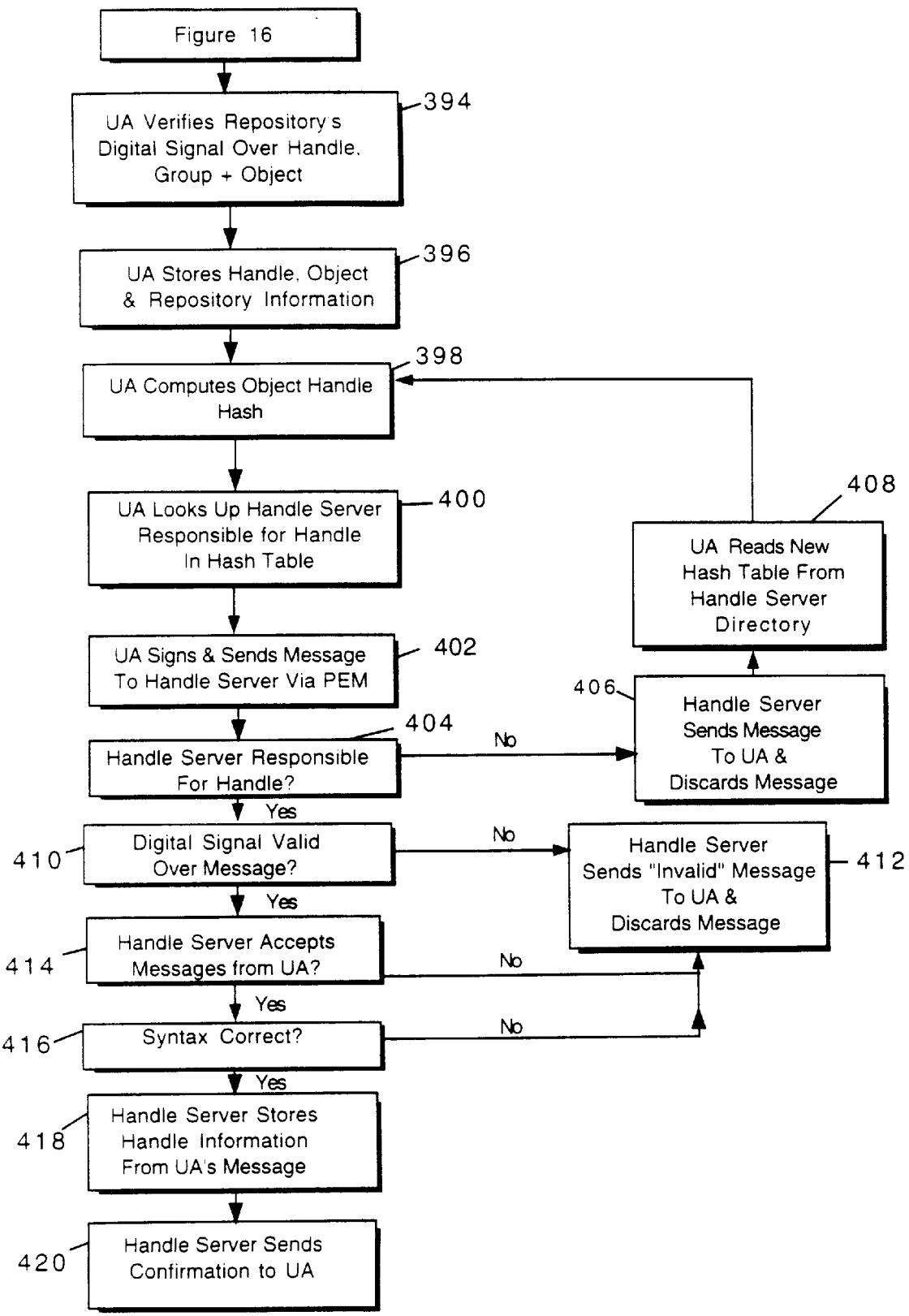
Figure 18:
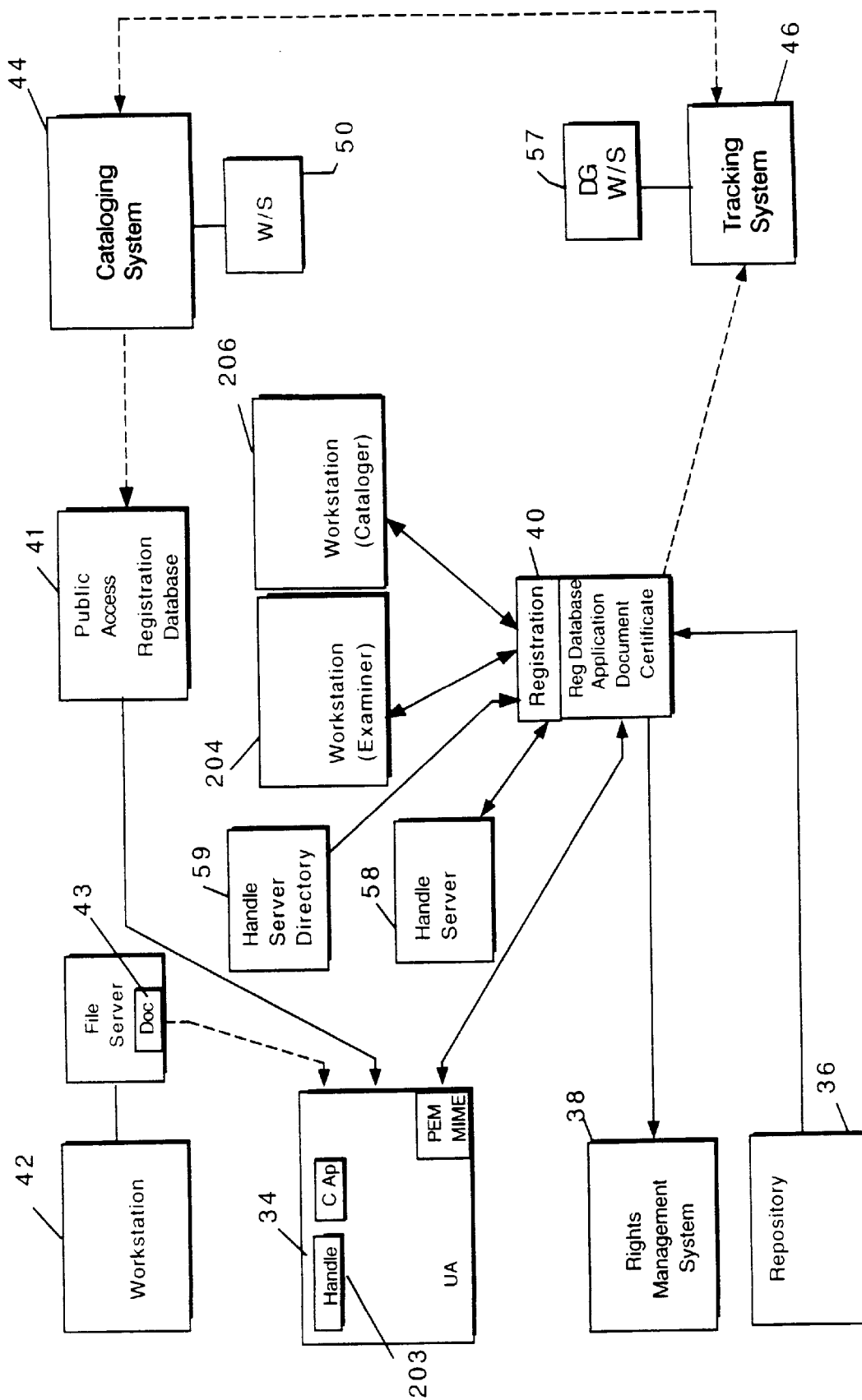
FIG. 18 is a block diagram of portions of the system.
Figure 19:
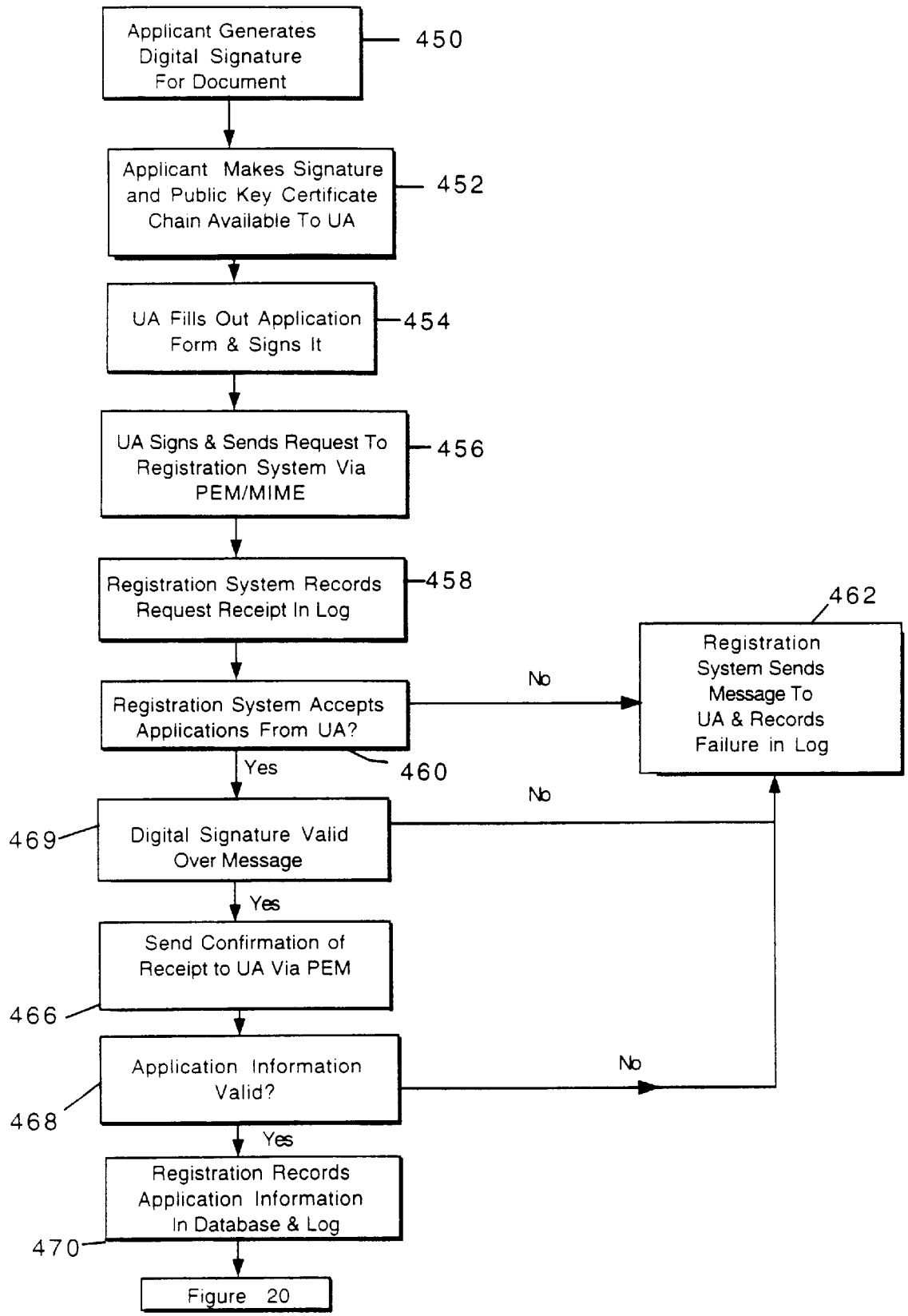
FIGS. 19 through 22 are flow charts of a registration application process.
Figure 20:
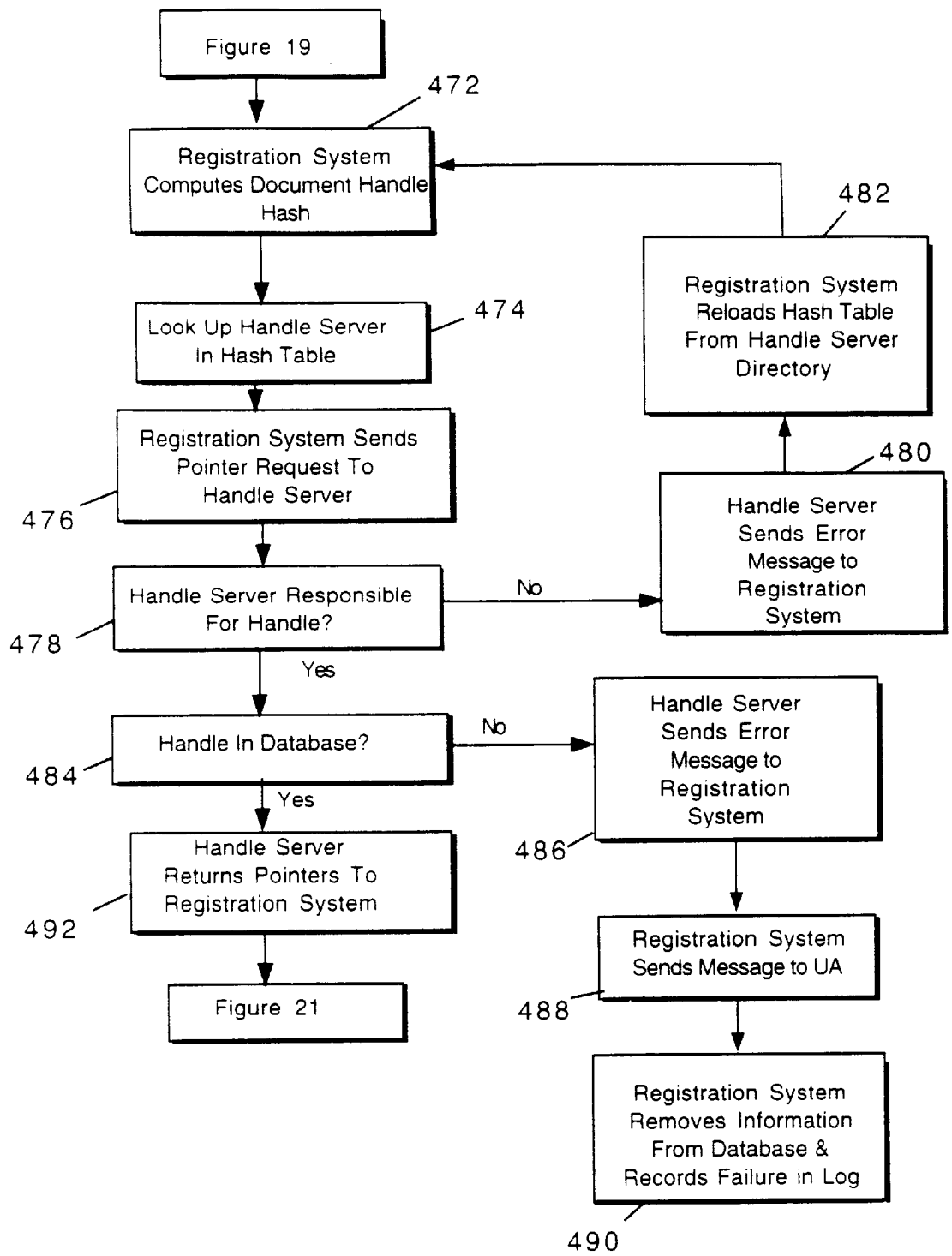
Figure 21:
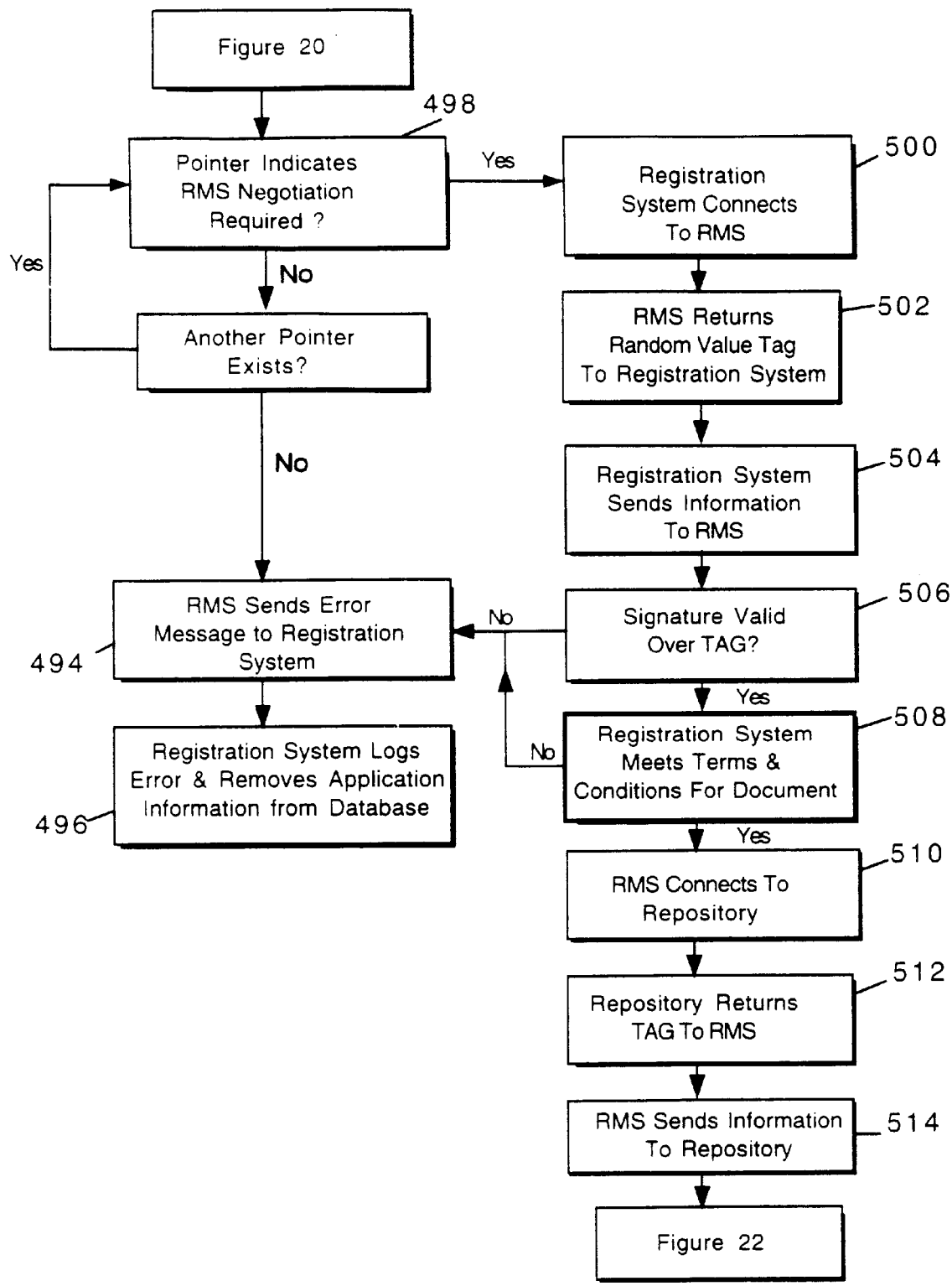
Figure 22:
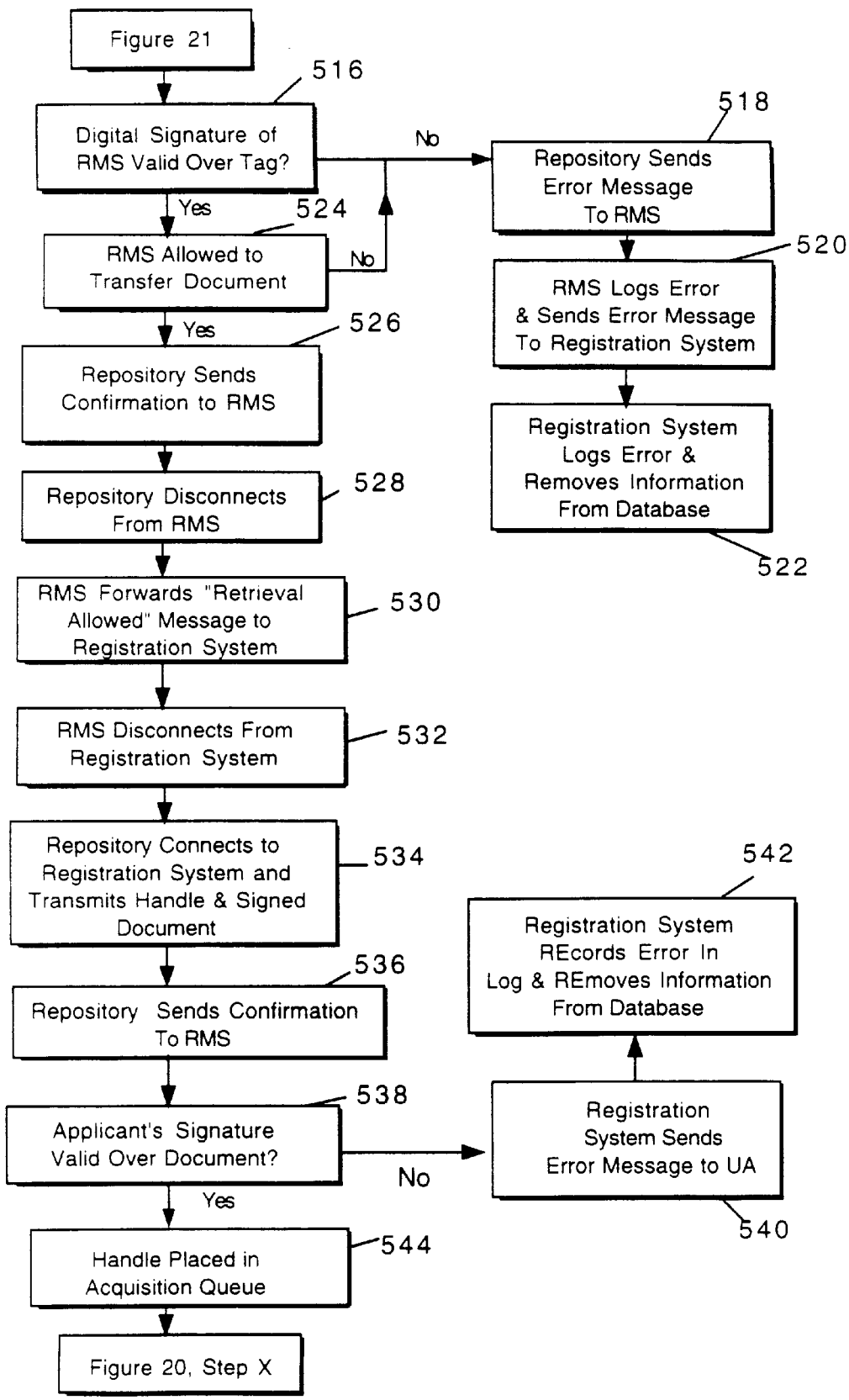
Figure 23:
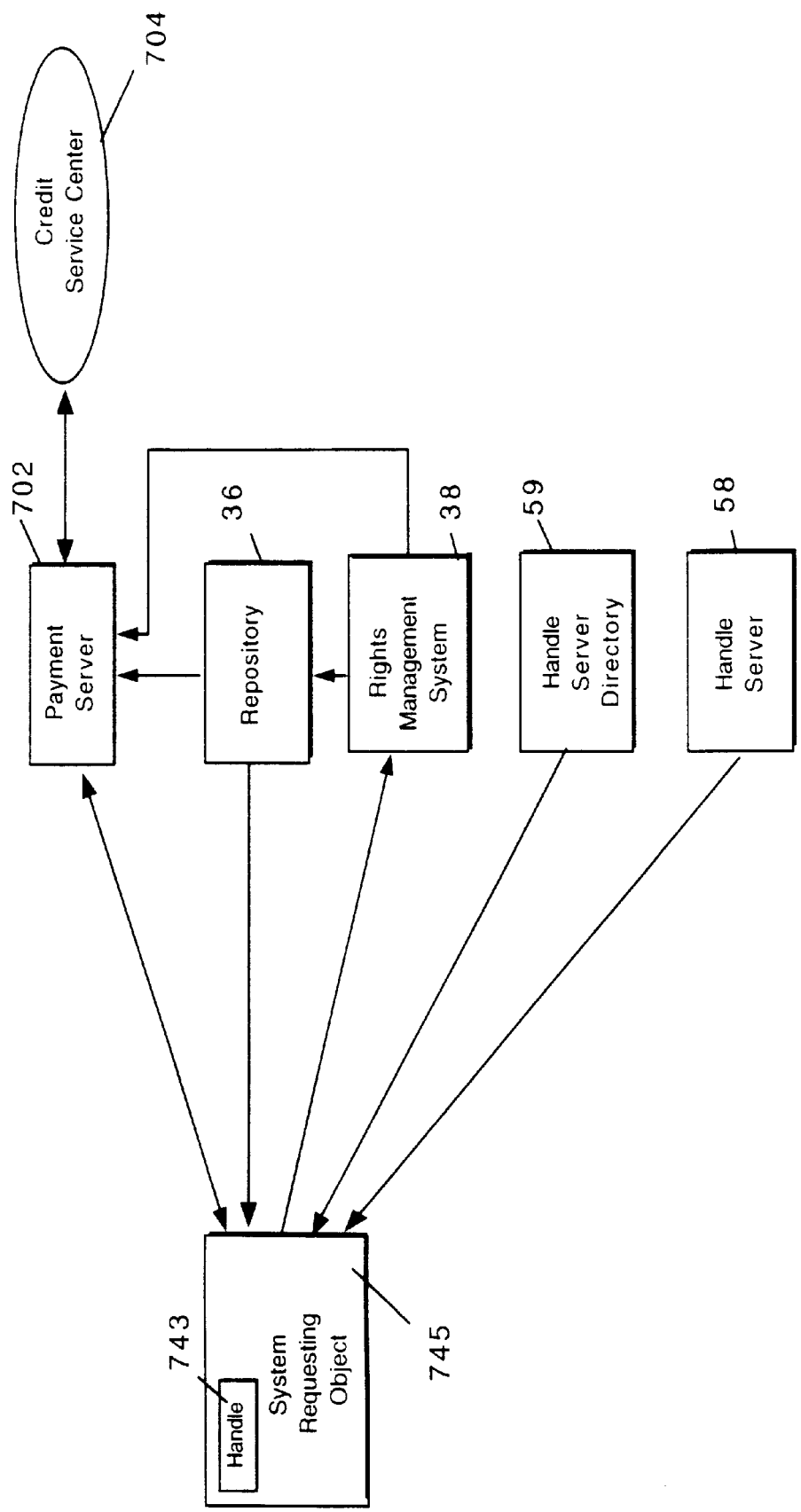
FIG. 23 is a block diagram of portions of the system.
Figure 24:
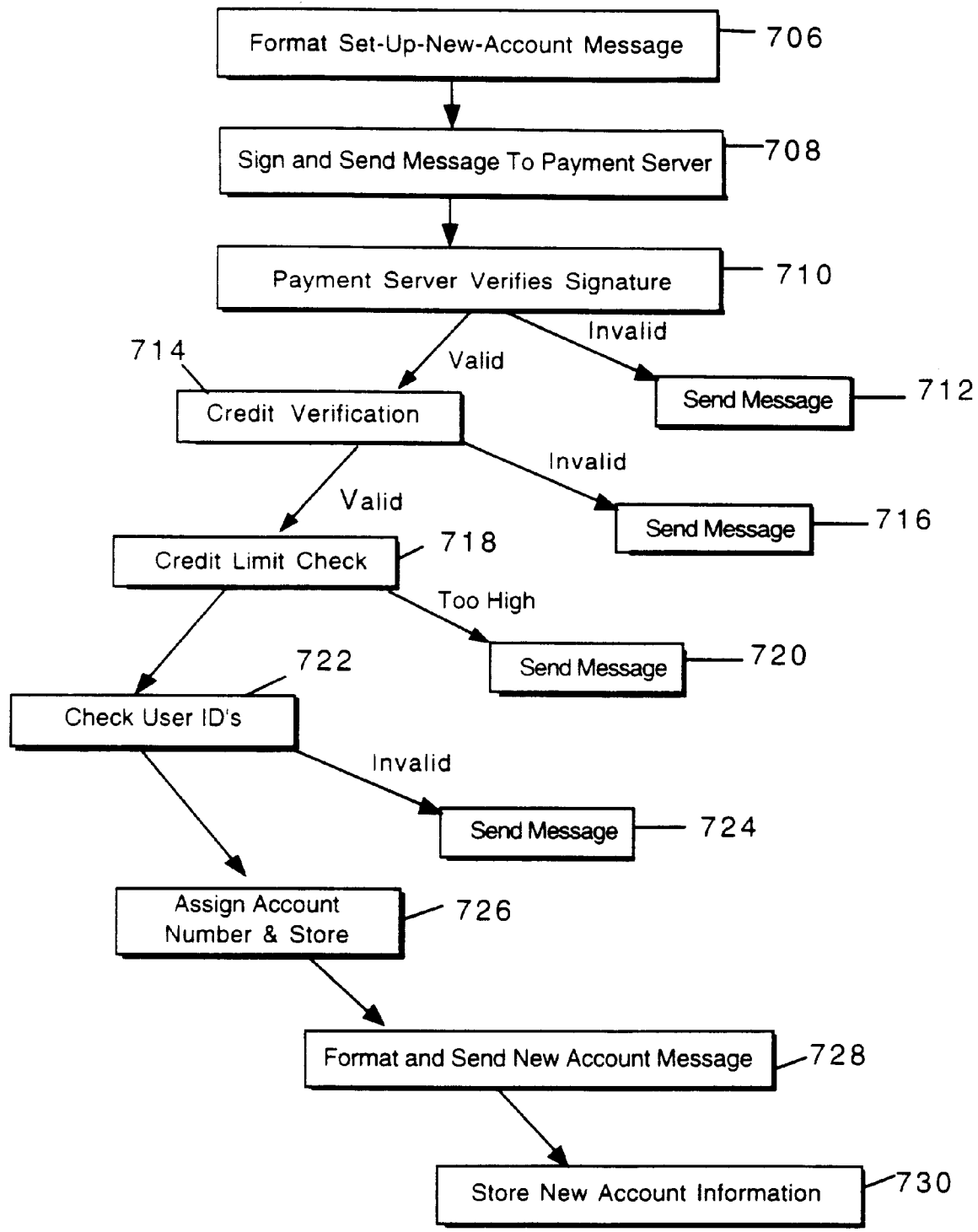
FIG. 24 is a flow chart of a process of setting up an account.

First, as seen in FIG. 9, the rights registration application is created, and the application and the associated object are submitted to the registration system. The steps required to perform this depend on the location of the digital object. In registering an object which is located on the applicant's own system, the applicant first makes the object available to his own system (if it was created somewhere else) (step 60). The applicant then runs a rights registration program in a step 62, and he fills in a rights registration application template. The application and the associated object are electronically mailed (as a PEM message) to the registration system (step 64), which performs simple syntactic checking on the application (step 66), and verifies that the associated object has not been corrupted (step 68).

If the object has not yet been placed in the repository, the applicant first places the object in the repository (step 70). The applicant then runs the rights registration program, and he fills in the copyright registration application template (step 62). The application and the object's handle are electronically mailed (PEM) to the registration system (step 64), which performs simple syntactic checking on the application (step 66). The registration system then retrieves the object from the repository in a step 72 and verifies that the retrieved associated object has not been corrupted (step 68).

After the registration system has checked the object, it creates an initial Receipt In Progress (RIP) record and sends it to the tracking system (step 74). The tracking system verifies that the account number presented in the record is valid and that sufficient funds exist in the account to process the application (step 76).

The application and the associated object can now be accessed by the rights examiner, by running an examiner's user interface program on the examiner's workstation (step 78). Once the examiner approves the application, the registration system assigns a registration number, and the system creates the rights registration certificate (step 80). A copy of the certificate is mailed electronically to the rights registrant. An updated RIP record which shows the registration application's final status is subsequently sent to the tracking system (step 82).

Registering an Object not in a Repository

The detailed steps for registering without first depositing a copy in a repository are shown in FIGS. 10 through 13.

First, the user 42 (the rights applicant) generates a digital signature for the object (step 250) using a private key and makes the object 43 (in one file), digital signature 45 (in a second file), and public key certificate chain 47 (in a third file) available to the UA system 34 (step 252). The UA user supplies rights registration application information 49 by filling out a form on the screen. If the user does not fill in the publication date field, then the object is considered unpublished by the rights registrar. If the field is filled in, then the object is treated like a published work. The UA user digitally signs the rights application information in a step 254.

The UA then sends a PEM/MIME message 202 to the registration system 40. (MIME is a multimedia electronic mail specification to allow for multimedia objects to be handled.) The message contains the object, the user's digital signature 45 over the object, the public key certificate chain 47 for the user, the rights registration application 49 information, a digital signature (not shown) over the rights registration application information, and the UA user's public key certificate chain (not shown) (step 256). The entire message is signed by the UA user.

The registration system 40 receives the PEM/MIME message. An entry recording the receipt of the message is placed into a log file in a step 258.

The registration system verifies that it accepts rights applications from the distinguished name of the UA user (step 260). If not, it returns a message to the UA user, and the verification failure is recorded in the log file (step 262).

The registration system attempts to validate the digital signature over the entire message in step 264. If validation fails (i.e., the decrypted hash value does not match the computed message hash or one of the certificates in the public key certificate chain has been revoked), a message is returned to the UA user. The validation failure is recorded in the log file (step 262). If the validation succeeds, then an application received message is sent to the UA user (step 266).

The registration system attempts to validate the rights registration information (only simple checks are performed) in step 268. If validation fails, a message is returned to the UA user. The validation failure is recorded in the log file (step 262).

If the object was included in the PEM/MIME message (step 270), the registration system attempts to validate the digital signature over the object (step 272). If validation fails, a message is returned to the UA user. The validation failure is recorded in the log file (step 262).

If the validations of the application information and the object (if it was included in the PEM/MIME message) were successful, then the following are entered in step 274 into the registration system's work in progress database: the application information; the digital signatures; the public key certificate chains; and the object (if available). The entry into the work in progress database is recorded in the log file.

If the PEM/MIME message did not include the object (step 276), the registration system attempts to retrieve a copy of it in step 278. If the attempt fails, a message is sent to the UA user (step 280). The application information, digital signatures, and public key certificates are removed from the work in progress database. Entries are made in the log file recording the retrieval failure and the removal of the information from the work in progress database in step 282.

If the retrieval attempt succeeds, then the registration system attempts to validate the digital signature over the object in step 284. If validation fails, a message is sent to the UA user (step 280). The application information, digital signatures, and public key certificates are removed from the work in progress database. Entries are made in the log file recording the validation failure and the removals from the work in progress database (step 282).

If the object has been published (the rights user filled in the published date field) (step 286), then the object is placed in the acquisition queue in step 288.

The registration system now prepares an initial Receipt In Progress (RIP) record (step 290). The registration system converts the information located in the title and claimant name fields in the registration request into the title and claimant name fields in the RIP record. The following conversions are performed: title words that are located in a stop word list are deleted and title words that are located in an abbreviated terms list are abbreviated.

A bar-code number (or other identifier) is assigned to the registration request (step 290). A verify and debit request, which contains the bar-code number (and other RIP record information) is formatted and sent to the tracking system via the File Transfer Protocol (FTP) in step 292.

The tracking system verifies the account (step 294) and debits the requested amount from the account. If the account is not valid, the tracking system will send an invalid account number presented message to the registration system (step 296). If the account is valid, but insufficient funds exist for this transaction (step 298), then the tracking system will send an insufficient funds message to the registration system (step 296). In either error case, the validation failure is recorded in the registration system's log file; and the rights registration application is removed from the works in progress database (step 282). If the object was unpublished, it is deleted from the registration system in step 300. If a published object and registration request is resubmitted, it is possible that a object might be placed in the acquisition queue multiple times. Manual procedures catch the duplicate entries.

If the tracking system 46 (FIG. 10) successfully performed the account verification and debit processing, it sends an account is OK message to the registration system in step 302. the tracking system prepares an initial RIP record and places it in it's database. If the object was unpublished, a copy of it is placed into the acquisition queue.

The registration system moves the registration request to the examiner queue database in step 304. The registrar user's workstation 50 (FIG. 10) now has access to the registration request. The examiner uses workstation 50 to view the object on the screen, to add his name to the examined by line on the application form and to record the class designation for the rights registration (step 306). The converted form of the author and title (as stored in the RIP record) are also shown to the examiner.

If the examiner approves the application (step 308), an examination-is-approved message is sent from the workstation to the registration system in a step 310. The registration system assigns a registration number (step 312), and the system creates and digitally signs the rights registration certificate, which includes the registration number and the date on which registration was granted (step 314). The rights registration certificate is sent in a PEM message to the UA user in a step 314. The certificate may be sent directly to the UA or indirectly via the repository. The certificate is archived on the registration system (step 312). The certificate also could be stored on a system that retains the scanned images of the manually created certificates.

If the examination results in the rights registration application being rejected, the examiner uses the workstation to send a rights registration rejection PEM message via the UA to the applicant explaining the rejection (step 318).

If the registration was approved or denied, an updated RIP record is forwarded to the tracking system in a step 320. Once the tracking system has added the record to its database, it sends a RIP-record-update-OK message to the registration system (step 322).

In step 324, the registration system moves the registration request to the cataloging system. The cataloger's workstation 57 (FIG. 10) now has access to this registration request.

Using a connection to the cataloging system, the cataloger creates the cataloging information in step 326. When the task is finished, the workstation sends a finished catalog message to the registration system (step 328). The registration system places a registration-application-processing-complete message in the log file (step 330).

Placing an Object into a Repository

Alternatively, the rights holder may choose first to place an object into a repository, as shown in FIGS. 14 through 17.

In a first step 350, the user 42 makes the object (object) available to the UA 34. The UA then sends a request for a handle to a handle generator system 36 (step 352).

The handle generator system sends a handle to the UA system (udp) in step 354.

The UA sends a PEM message to the rights management system 38 containing the handle, any non-simple terms and conditions for obtaining a copy of the object (which must include free access to the object for the registrar), and the list of distinguished names of those who are allowed to make changes to the information (stored in the RMS) which is associated with the handle (step 356). The PEM message is signed by the UA user.

The RMS verifies that it accepts new submissions from the distinguished name of the UA user in step 358. If not, the RMS sends an invalid-distinguished-name PEN message to the UA user and discards the contents of the received message (step 360).

The RMS validates the digital signature on the received PEM message (step 362). If the validation fails, the RMS sends an invalid-digital-signature PEM to the UA user and discards the contents of the received message (step 360).

The RMS verifies that it does not already have a set of terms and conditions stored for the handle (step 364). If it does, it sends a terms-and-conditions-already-registered PEM to the UA user and discards the contents of the received message (step 360).

The RMS stores the handle and the associated terms and conditions (step 366) and sends a confirming PEM to the UA user (step 368).

In a step 370, the UA system computes the digital signature over: the object's handle; a date/time group (the nominal date/time of submission of the object to the repository); and the object.

The UA system sends a PEM/MIME message to the repository 36 (FIG. 14) containing the object's handle, the submission date/time group, the object (or the information needed to retrieve a copy of the object), the UA user's digital signature over the above, the UA user's public key certificate chain, the simple terms and conditions for the object, if any, and the distinguished name or names of the RMS(s) holding the non-simple terms and conditions for the object, if applicable. The entire message is signed by the UA user (step 372).

The repository verifies that it accepts object submissions from the distinguished name of the UA user in a step 374. If not, it sends an invalid-distinguished-name PEM message to the UA user and discards the received message (step 376).

The repository validates the digital signature over the entire message in step 378. If the validation fails, the repository sends an invalid-digital-signature PEM message to the UA user and discards the received message (step 376).

If the object was not included in the received PEM/MIME message (step 380), the repository attempts to retrieve a copy of the object (e.g., via anonymous FTP) in a step 382. If retrieval fails, the repository sends an object-retrieval-failed PEM message to the UA user and discards the received message (step 376).

The repository validates the UA user's digital signature over the handle, nominal submission date/time group, the object (step 384), and the reasonableness of the submission date/time group (not in the future, not too far in the past) (step 386). If either of these validations fail, the repository sends an invalid-submission PEM to the UA user and discards the received message (step 376).

In step 388, the repository stores the object's handle, the submission date/time group, the object, the UA user's digital signature over the above, the UA user's public key certificate chain, the simple terms and conditions for the object, if any, the distinguished name of RMS, if applicable, and other properties. The repository then computes its own digital signature over the handle, the submission date/time group from the received message and the object (step 390). In step 392, the repository sends a PEM to the UA user containing the handle, the repository's digital signature, and the repository's public key certificate chain.

In step 394, the UA system verifies the repository's digital signature over the handle, date/time group, and object. The UA system then stores the handle, the nominal submission date/time group, the object, the repository's digital signature, and the repository's public key certificate chain (step 396).

The UA system computes the hash of the object's handle using the handle system hashing function (step 398). The UA system then looks up the domain name of the handle server 38 responsible for the handle in its cached copy of the hash value/handle server table (step 400).

In step 402, the UA system sends a PEM to the handle server containing the handle, and one or more pairs of domain name of repository and domain name of the RMS, and a list of distinguished names of persons who are permitted to change the pairs of domain names associated with the handle. The message is signed by the UA user.

The handle server receives the PEM message and verifies that it is responsible for the handle in step 404. If not, it sends an invalid-handle-server-selected PEM to the UA user and discards the other information (step 406). If the UA system receives an invalid-handle-server-selected rejection message from the handle server, it downloads a new copy of the hash value/handle server table from the handle server directory 59 (FIG. 15) (step 408) and repeats steps 398 through 404.

If the handle server is responsible for the handle submitted by the UA system, it validates the digital signature over the PEM message in step 410. If the validation fails, the handle server sends an invalid-digital-signature PEM message to the UA user and discards the other information (step 412).

The handle server verifies that it accepts submissions from the distinguished name of the UA user in step 414. If not, the handle server sends an invalid-distinguished-name PEM message to the UA user and discards the other information (step 412).

The handle server verifies the syntax of the pairs of domain names submitted with the handle in step 416. If it detects any errors, it sends an invalid-handle-submission-record syntax PEM message to the UA user and discards the other information (step 412).

The handle server stores the handle, the pairs of domain names, and the list of distinguished names (step 418) and sends a PEM acceptance message to the UA user (step 420).

Registering an Object Already in a Repository

After the object has been deposited, an application to register may be submitted (FIGS. 18 through 22).

The user (the rights applicant) 42 first generates a digital signature for the object (step 450) and makes the digital signature (in a file), and public key certificate chain (in a second file) available to the UA system 34 (step 452).

The UA user supplies the rights registration application information by filling out a form on the screen in step 454. This includes the handle 203 for the object already stored in a repository. Any object stored in a repository is considered published by the rights registrar. Therefore, the publication date field must be entered in the application form. The UA user digitally signs the rights application information.

In step 456, the UA system sends a PEM/MIME message to the registration system 40 containing the object's handle, the user's digital signature over the object, the public key certificate chain for the user, the rights registration application information, the digital signature over the rights registration application information, and the UA user's public key certificate chain. The entire message is signed by the UA user.

The registration system receives the PEM message. An entry recording the receipt of the message is placed into a log file in step 458. The registration system then verifies that it accepts rights applications from the distinguished name of the UA user (step 460). If not, it returns an unknown-account PEM to the UA user, and the verification failure is recorded in the log file (step 462).

The registration system attempts to validate the digital signature over the entire message in step 464. If validation fails (i.e., the decrypted hash value does not match the computed message hash or one of the certificates in the public key certificate chain has been revoked), a received-corrupted-application PEM is returned to the UA user. The validation failure is recorded in the log file in step 462.

If the validation succeeds, then an application-received PEM is sent to the UA user in step 466.

The registration system attempts to validate the rights registration information (only simple checks are performed) in step 468. If validation fails, a rights-application-is-formatted-incorrectly PEM is returned to the UA user. The validation failure is recorded in the log file (step 462).

If the validation of the application information was successful, then the following are entered into the registration system's work in progress database: the application information, the digital signatures, and the public key certificate chains. The entry into the work in progress database is recorded in the log file in step 470.

The registration system hashes the object's handle in step 472. It uses this hash to perform a table lookup in the hash code/handle server table (step 474), which was previously obtained from the handle server directory. The registration system then sends a request-for-pointer-information UDP packet to a handle server 58 (FIG. 18) in step 476.

In step 478, the handle server verifies that the handle falls within the set of handles for which hash values it is responsible. If it is not in this set, the handle server sends an invalid-handle-server-selected response UDP packet to the registration system (step 480).

If the registration system receives an invalid-handle-server-selected response UDP packet, it refreshes its hash code/handle server table from the handle server directory (step 482), and the registration system repeats steps 472 and 474.

If the handle server is responsible for the handle, it verifies that the handle is present in its database in step 484. If not, it sends a handle-not-found response UDP packet to the registration system (step 486).

If the registration system receives a handle-not-found response UDP packet, it returns a requested-object-is-unavailable PEM message to the UA user (step 488), and the handle lookup failure is recorded in the log file. The registration system removes the entry for the registration request from the work in progress database in step 490.

If the handle server has the handle in its database, it returns the pointers associated with the handle in a UDP packet to the registration system in step 492.

For each pointer returned by the handle server, the registration system tries to obtain a copy of the object. If a copy is successfully obtained from one repository 36 (FIG. 18), then the rest of the pointers are ignored. If the registration system cannot obtain the object from any of the repositories, the registration system returns an unable-to-obtain-a-copy-of-the-object PEM to the UA user (step 494). The failure to retrieve the object is recorded in the registration system's log file, and the rights registration entry is removed from the work in progress database (step 496).

If a pointer does not indicate that RMS 38 (FIG. 18) negotiation is required, the registration system ignores the object pointer. If a pointer does indicate that RMS negotiation is required (step 498), the registration system attempts to obtain the object via the RMS. First, in step 500, the registration system connects to the RMS.

The RMS returns a random-value tag to the registration system in step 502. In step 504, the registration system sends the following information to the RMS: the object's handle, the registrar's digital signature over the RMS generated random-value tag, the registrar's public key certificate chain, the domain name and the port number which will be used by the registration system to receive the object.

The RMS validates the digital signature over the random-value tag in step 506. If the signature is not correct, the RMS sends an invalid-random-value-tag response to the registration system in step 494. The registration system logs this error and removes the rights registration information from the work in progress database (step 496).

The RMS verifies in step 508 that the registration system meets the terms and conditions for the object. If the registration system does not meet the terms and conditions, a requester-unauthorized-rejection response is returned to the registration system (step 494). The registration system logs this error and removes the rights registration information from the work-in-progress database (step 496).

The RMS connects to the repository in step 510, and the repository returns a random-value tag to the RMS (step 512).

The RMS sends the following information to the repository in step 514: the object's handle; the RMS digital signature over the repository generated random-value tag; the RMS public key certificate chain; and the domain name and the port number which are used by the registration system to receive the object.

The repository verifies the digital signature of the RMS over the random-value tag in step 516. If the signature is not correct, the repository sends an invalid-random-value-tag response to the RMS (step 518). The RMS logs the error and sends a remote-RMS-error-invalid-random-value-tag error to the registration system in step 520. The registration system then logs this error and removes the rights registration information from the work in progress database (step 522).

In step 524, the repository verifies that the RMS is allowed to request object transfers for the object. If the transfer is not allowed, the repository sends an invalid-RMS response to the RMS (step 518), which forwards the response to the registration system (step 520). The registration system logs the error in its log file, and the rights registration information is removed from the work in progress database (step 522).

The repository sends a object-retrieval-is-allowed response to the RMS (step 526), and the repository disconnects from the RMS (step 528).

The RMS forwards the object-retrieval-is-allowed response to the registration system (step 530), and the RMS disconnects from the registration system (step 532).

The repository connects to the address/port specified in the original request, and it transmits to the registration system the object's handle and the object, signed by the repository in step 534. The repository then sends a object-has-been-delivered confirmation to the RMS (step 536).

The registration system validates the user's digital signature over the object in step 538. If validation fails, an invalid-object-digital-signature-presented PEM message is returned to the UA user in step 540. In step 542, the validation failure is recorded in the log file, and the rights registration is removed from the works in progress database.

Steps 286 et seq. (FIG. 11) are then followed. The registration system prepares an initial receipt in progress (RIP) record (step 290). The registration system converts the information located in the title and claimant name fields in the registration request into the title and claimant name fields in the RIP record. The following conversions are performed: title words that are located in a stop word list are deleted and title words that are located in an abbreviated terms list are abbreviated.

The object is placed into the work in progress database. A bar-code number is assigned to the registration request (step 290). A verify-and-debit request, which contains the bar-code number (and other RIP record information) is formatted and sent to the tracking system in step 292.

The tracking system verifies the account and debits the requested amount from the account in step 294. If the account is not valid, the tracking system will send an invalid-account-number presented message to the registration system (step 296). If the account is valid, but insufficient funds exist for this transaction (step 298), then the tracking system will send an insufficient-funds message to the registration system (step 296). In either error case, the validation failure is recorded in the registration system's log file; the rights registration is removed from the works in progress database (step 282).

If the tracking system successfully performed the account verification and debit processing, it sends a account-is-OK message to the registration system in step 302. the tracking system prepares an initial RIP record and places it in its database.

The registration system then moves the registration request to the examiner queue database in step 304. The examiner's workstation now has access to this registration request. The examiner uses the workstation 50 (FIG. 18) to view the object on the screen, to add his name to the examined by line on the application form and to record the class designation for the rights registration (step 306). The converted form of the author and title (as stored in the RIP record) are also shown to the examiner.

If the examiner approves the application in step 308, an examination-is-approved message is sent from the workstation to the registration system (step 310). The registration system assigns a registration number (step 312), and the system creates and digitally signs the rights registration certificate, which includes the registration number and the date on which registration was granted (step 314). The rights registration certificate" is sent in a PEM message to the UA user in step 316. The certificate is archived on the registration system.

If the examination results in the rights registration application being rejected, the examiner uses the workstation to send a rights-registration-rejection PEM message to the applicant explaining the rejection (step 318).

If the registration was approved or denied, an updated RIP record is forwarded to the tracking system in step 320. Once the tracking system has added the record to its database, it sends a RIP-record-update-OK message to the registration system (step 322).

The registration system moves the registration request to the catalog queue database in step 324. The cataloger's workstation 57 (FIG. 19) now has access to this registration request. Using a telnet window connected to the cataloging system, the cataloger creates the cataloging information (step 326). When he is finished, the workstation sends a finished catalog message to the registration system in a step 328. In step 330, the registration system places a registration-application-processing-complete message in the log file.

Once the registrar has completed its work, the object itself may be purged from the files of the registrar because the digital signature and the existence of the full object at a repository are sufficient to assure that a valid copy of the object may be obtained at any time. This significantly reduces the storage requirements at the registrar.

Software Organization

The following software packages run on workstation 42:

| | |
|---|---|
| MH w/PEM and MIME extensions | MH is a full featured user agent for handling Internet mail. Rather then being a single comprehensive program, MH consists of a collection of fairly simple single-purpose programs to send, receive, save, and retrieve messages. MH is extensible, other user agents may be layered on top of the MH executables. The MIME extensions provide multiple part multiple body type message capabilities (e.g., for multimedia mail) |
| PEM administrative tools | These tools are used to generate private and public keys and user certificates. |

The following executables run on the rights user's workstation 42:

| | |
|---|---|
| submit_registration | This tool is used to create and submit a rights registration application. |
| install_ipms | This tool will install the MH/PEM and submit_registration tools on the rights user's workstation. |

The registration and recordation system (RRS) must perform the following activities: the RRS must provide the user interface (as an X-windows client) for rights office personnel to view, edit, approve, reject or defer rights registration applications; the RRS must provide the user interface (as an X-windows client) for rights office personnel to view digital objects; the RRS must support electronic mail transmission and reception; the RRS must maintain several queues of the rights registration application as it passes through the various states of reception, examining and approval/disapproval; until the repository is completed, the RRS must save all of the digital objects received (as a temporary repository; until another storage is facility is created/found, the RRS must retain all of the registration certificates that have been generated.

The following software packages run on the UA host:

| | |
|---|---|
| MH w/PEM and MIME extensions | MH is a full featured user agent for handling internet mail. Rather then being a single comprehensive program, MH consists of a collection of fairly simple single-purpose programs to send, receive, save, and retrieve messages. MH is extensible, other user agents may be layered on top of the MH executables. |
| PEM administrative tools | These tools are used to generate private and public keys and user certificates. |

The following executables run on the rights user's workstation:

| Program/Daemon | Performs |
|---|---|
| receive_application | When sendmail receives a message addressed to "submit_registration", it will pass the message to receive_application, which will perform the initial verifications on the message. |
| retrieve_object | If the object was not included in the original message, this program attempts to retrieve the object. This program is executed periodically by cron. This program is also responsible for performing time-out functions (for retrieving the object). |
| prepare_init_RIP_record | This program, which is started by receive_application or retrieve_object is used to create and queue the initial RIP record, which will be sent to the tracking system. |
| xmit_files_to_the tracking system | This program, started by cron, is used to send already formatted files to the tracking system. |
| get_files_from_the tracking system | This program, started by cron, is used to retrieve response files from the tracking system. |
| process_init_RIP_response | If get_files_from_the tracking system receives an initial RIP record response, it invokes this program to handle the response from the tracking system. |
| view_application | This user application is invoked by the Examiner to view, edit, accept or reject the rights application. This program also displays the digital objects to the Examiner. The cataloger may also use this program to view the application and associated digital object. |
| application_queue_server | This is the "back-end" process that manages application/object requests received from user programs (i.e. view_application.) |
| send_resp_to_applicant | This program, which is invoked by view_application, is used to send the application approval and certificate or the application rejection to the rights applicant. |
| update_RIP_record | This program, which is invoked by view_application, is used to create an updated RIP record, which will be transmitted to the tracking system, using xmit_files_to_the tracking system. |
| process_update_RIP_resp | If get_files_from_the tracking system receives an updated RIP record response, it invokes this program to handle the response from the tracking system. |
| install_rrs | This program is used to install the additional configuration files and software required for the RRS system. | retrieve_object
prepare_init_RIP_record
xmit_files_to_the tracking system
get_files_from_the tracking system
process_init_RIP_response
view_application
application_queue_server
send_resp_to_applicant
update_RIP_record
process_update_RIP_resp
install_rrs Obtaining a Digital Object from a Repository This section describes how a user may obtain an account and retrieve digital objects from repositories.

Before a user can retrieve any objects for which payment is required, the user must first establish an account with a payment server system 702 on the network (FIG. 25). This system will be used to create new accounts, debit and credit user accounts, and interface with one or more credit service centers 704. Payment servers have the following attributes:

Payment servers must be qualified; it must be possible to verify that a payment server is valid. This may be accomplished by establishing payment server distinguished names; if a signed message is received from a server with a payment server distinguished name, then the payment server is valid.

Payment servers may charge users for establishing accounts.

Users may request server information (including establishing account charges) from a server before attempting to set up a new account.

The following steps (FIG. 26) illustrate how a user can establish a new account with a payment server. A user must have a certificate and a valid credit card number in order to establish an account.

The user (or his software agent) formats (706) a setup-new-account message containing the following:

The user's credit card number or other credit information;

Other identifying information, such as a street address, phone number;

Requested credit amount;

A list of valid signatures (either public key certificates and their associated certificate chains or distinguished names) for people allowed to charge to the account.

Optional category of use (e.g. this account is used to retrieve video objects only.)

Optional time limit (e.g. this account will be valid until Dec. 31, 1995.) The payment server will normally keep an account active as long as a minimum line of credit is available.

The setup-new-account message is digitally signed by the person establishing the account, and the signed message is sent (708) to the payment server with the above information.

The payment server verifies the signature on the received message (710). If the signature is invalid, the payment server sends an invalid-signature message to the user's system (712). Optionally, it may identify a maximum allowed credit limit.

If the signature is valid, using standard electronic credit card checking protocols or other methods as appropriate, the payment server electronically verifies the credit card number or other credit information, and requested credit line with a credit card service center or other credit authority (714). If the credit card number or other credit information is not valid (718), the payment server will send an invalid-credit-card message to the user's system (720).

If the requested credit limit is too high, the payment server will send a requested-credit-limit-is-too-high message to the user's system.

The payment server will verify that the other authorized user's identities are valid (722). If any are invalid, an invalid-authorized-user-specified message is sent (724) to the user's system.

The payment server assigns an account number to the user (726) and stores the account information in a database for later use.

The payment server formats a new-account-response message (728) containing the following:

Account Number

Credit Limit Amount

Time Limit

Categories of Use

List of authorized users (public key certificates plus the certificate chains.)

The requesting system or user's public key certificate chain, which will be used to verify the requestor's identity. Other less efficient methods can also be used, e.g. the payment server could be given sufficient information (the distinguished name) about the user to obtain the certificate chain from another database.

The payment server signs the formatted message and sends it to the user's system. Optionally, the user may be charged a fee for establishing this account and for maintaining it.

The user's system encrypts and stores (730) the received signed message. This account data will be submitted with any activity that may be billed.

Retrieving from a Repository (Simple Terms and Conditions)

Once an account is established, the user may retrieve an object from the repository by the following steps (FIGS. 25 and 27).

The system requesting the digital object obtains (740) the hash code/handle server table from the handle server directory 59. This is done during the system's initialization.

A user (or more likely, his software agent) obtains a handle 743 for an object (742). The handle may be obtained as part of a result of a bibliographic search or be provided by some other electronic means such as an electronic reference list in another object, or by scanning a barcoded sequence on paper. The system that is retrieving the digital object is referred to as the requesting system 745.

Once the handle is obtained, the system that retrieves the object "hashes" the object's handle and uses this hashed value to perform a table lookup in the hash code/handle server table 744.

The requesting system sends a request-for-pointer-information UDP packet 748 to the handle server. One or more pointers, once returned, identifies the network location of the one or more repositories (if one is associated with the object) and one or more rights management system, if one is associated with the object. This strategy assures a random distribution of handle server requests among many handle servers distributed on a network without a central nodal point in the system (for reliability). The handle server verifies that the handle falls within the set of handles for whose hash values it is responsible 750.

If it is not in this set, due to some dynamic system change or error condition, the handle server sends an invalid-handle-server-selected response UDP packet to the requestor 752.

If the requesting system receives an invalid-handle-server-selected response UDP packet, it refreshes its hash code/handle server table from the handle server directory, and the requesting system repeats prior steps. This will typically be needed only if the table has changed between the time the table was downloaded and the actual request was made.

If the handle server is responsible for the handle, it verifies that the handle is present in its database 756. If not, it sends a handle-not-found response UDP packet to the requesting system 758. If the requesting system receives a handle-not-found response UDP packet, it informs (760) the user that it is unable to retrieve the object.

An object may be stored in several repositories. Multiple pointers to these repositories may be returned to the requesting system. For each pointer returned by the handle server, the requesting system uses the pointer to attempt to obtain a copy of the digital object 762. If a copy is successfully obtained from one repository, the rest of the pointers will generally be ignored. If the requesting system cannot obtain the object from any of the repositories, it informs the user that it is unable to retrieve the object 764.

For retrieval purposes, the requesting system establishes a connection to the repository 766, which takes the form of a small set of transactions. The repository may examine the calling network address or the requesting system in order to determine if the repository is being inundated with requests from one system. If the repository determines that it is being bombarded, the repository may disconnect from the requesting system and refuse to accept additional requests for a period of time 768.

Normally, however, the repository returns a random-value tag to the requesting system 770. A flag indicating if payment is required to obtain "Terms and Conditions" is included.

The requesting system needs the object's "Terms and Conditions" before the object can be retrieved. The requesting system signs and sends the following request-terms-and-conditions message 772 to the repository:

the object's handle;

the requesting system or user's digital signature over the repository generated random-value tag;

the requesting system or user's public key certificate chain, which will be used to verify the requestor's identity. Other less efficient methods can also be used, e.g. the repository could be given sufficient information (the distinguished name) about the user to obtain the certificate chain from another database. This is needed in the event the repository needs to bill for providing the Terms and Conditions;

a unique tag, assigned by the requesting system;

account information, previously signed by the payment server.

The repository verifies the digital signature of the requestor over the repository generated random-value tag 774. If the signature is not correct, the repository sends an invalid-random-value-tag response to the requesting system. The requesting system should log this error.

The repository verifies the payment server's signature over the account information 778. If the signature is not correct, the repository sends an invalid-account-information response to the requesting system. The requesting system should log this error.

The repository retrieves the Terms and Conditions associated with the specified handle 790. If no object is associated with the handle, the repository sends an object-not-found message to the requesting system. The requesting system should log this error.

Otherwise, the repository signs the "Terms and Condition" message and sends 792 it to the requesting system, including:

The objectized list of terms/conditions/rights, along with the charge associated with each object and a status flag showing if the term/condition/right is mandatory;

The user-assigned unique key, which was received in the request-terms-and-conditions message;

Either the original random-value tag or possible a new random-value tag, generated by the repository. This is to avoid play back protection in the event the object identified by the handle is retrieved later.

The requesting system verifies the repository's signature over the received "Terms and Conditions" message 794. If the signature is invalid, the error is logged.

The user selects the terms and conditions desired 796, including the number of terms (e.g., A user may buy the right to make 5 copies of the object or to perform it ten times). The requesting system uses this information to create the retrieve-object message, including:

the object's handle 798;

the repository generated random value tag;

a list of the accepted "Terms and Conditions", including the quantity of each, where applicable;

the user's account information, which was originally signed by the payment server;

the requesting system or user's public key certificate chain, which will be used to verify the requestor's identity. Other less efficient methods can also be used, e.g. the repository could be given sufficient information (the distinguished name) about the user to obtain the certificate chain from another database. the domain name and the port number which are used by the requesting system to receive the object.

limitations, if any, on the object by the requesting system (e.g. maximum object size it can receive)

The entire message is signed by the requestor. This is similar to signing a credit card slip.

The repository verifies the digital signature of the requestor over the random-value tag 800. If the signature is not correct, the repository sends an invalid-random-value-tag response to the requesting system 802. The requesting system should log this error.

The repository establishes a connection to the payment server, 804.

The payment server returns a random-value tag to the repository 806.

The repository formats a debit-account message 808, including:

The retrieve-object message, as received by the repository and signed by the requestor;

The random value tag received from the payment server;

The repository's public key certificate chain, which will be used to verify the repository's identity. Other less efficient methods can also be used, e.g. the payment server could be given sufficient information (the distinguished name) about the user to obtain the certificate chain from another database.

The repository signs the retrieve-object and random-value portion of the message. The repository sends the debit-account message to the payment server system.

The payment server system validates the repository's signature over the debit-account message 810. If the signature is invalid, the payment server logs the error and sends a invalid-vendor-signature message to the repository.

The payment server system then validates the requestor's signature over the contained retrieve-object message 812. If the signature is invalid, an invalid-requestor-signature message is sent to the repository.

The payment server validates the account information sent to it and verifies that the account is valid. If the requester is not a valid user of the account, a invalid-user-for-account message is sent to the repository, and the payment server logs the event.

Otherwise, the payment server, using already existing electronic credit verification methods, verifies that the amount may be charged to the account 816.

If the credit check is not successful, the appropriate error message (e.g. "Credit Line is insufficient", "Credit Card has Expired") is logged and sent to the repository.

Otherwise an account-has-been-debited message is signed by the payment server and sent to the repository 818.

The repository connects to the address/port specified in the request, and it transmits 820 to the requesting system:

the object's handle;

the total amount debited from the account;

the object, signed by the repository;

portions of the relevant terms and conditions, if appropriate.

Retrieving Under Non-Simple Terms and Conditions

The following steps are followed for retrieving an object under non-simple terms and conditions.

If the user does not know the current terms and conditions associated with the object, steps 740 through 794 (FIGS. 27 and 28) are first performed. If the user determines that the terms and conditions returned by the repository are not appropriate by themselves, then additional negotiations with the RMS associated with the digital object are required.

If a user already knows that negotiations are required with an RMS, but the RMS associated with the digital object is not yet known, then the user's system must perform steps 740 through 764 (FIG. 27).

Otherwise, referring to FIG. 29, the requesting system establishes a connection to the RMS 830.

The RMS returns a random-value tag to the requesting system 832.

The requesting system sends the following information to the RMS:

the object's handle;

the requestor's digital signature over the RMS generated random-value tag;

the requestor's public key certificate chain;

the domain name and the port number which will be used by the requesting system to receive the object;

a random value tag, assigned by the requesting system;

the accounting data previously signed by the payment server.

The RMS validates the digital signature over the signed random-value tag 836. If the signature is not correct, the RMS sends an invalid-random-value-tag response to the requesting system. The requesting system logs this error.

The repository verifies the payment server's signature over the account information 838. If the signature is not correct, the repository sends an invalid-account-information response to the requesting system. The requesting system should log this error.

The RMS enters into a mixed initiative dialog 840 with the user to determine what terms and conditions are mutually acceptable, if any. This may also entail human interaction.

The RMS connects to the repository 842, and the repository returns a random-value tag to the RMS 844.

The RMS sends 846 the following information to the repository:
- the object's handle;
- the RMS's digital signature over the repository generated random-value tag;
- the RMS public key certificate chain;
- the domain name and the port number which are used by the requesting system to receive the object;
- the account information, previously signed by the payment server.

The repository verifies the digital signature of the RMS over the random-value tag 848. If the signature is not correct, the repository sends an invalid-random-value-tag response to the RMS. The RMS logs the error and sends a remote-RMS-error-invalid-random-value-tag error to the requesting system. The requesting system logs this error.

The repository verifies that the RMS is allowed to request object transfers transfer is not If the transfer is not allowed, the repository sends an "invalid RMS" response to the RMS, which forwards the response to the requesting system. The requesting system logs the error in its log file.

The repository establishes a connection to the payment server 850.

The payment server returns a random-value tag to the repository 852.

The repository formats a debit-account message 854, including:
- The retrieve-object message, as received by the repository and signed by the requestor;
- The random value tag received from the payment server;
- The repository's public key certificate chain, which will be used to verify the repository's identity. Other less efficient methods can also be used, e.g. the payment server could be given sufficient information (the distinguished name) about the user to obtain the certificate chain from another database.

The repository signs the retrieve-object and random-value portion of the message.

The repository sends the debit-Account message to the payment server system.

The payment server system validates the repository's signature over the debit-account message. If the signature is invalid, the payment server logs the error and sends a invalid-vendor-signature-message to the repository.

The payment server system then validates the requestor's signature over the contained retrieve-object message. If the signature is invalid, an invalid-requestor-signature message is sent to the repository.

The payment server validates the account information sent to it and verifies that the account is valid.

If the requestor is not a valid user of the account, a invalid-user-for-account message is sent to the repository, and the payment server logs the event.

Otherwise, the payment server, using already existing electronic credit verification, verifies that the amount may be charged to the credit card associated with the account 860.

If the credit check is not successful, the appropriate error message (e.g. "Credit Line is insufficient", "Credit Card has Expired") is logged and sent to the repository.

Otherwise an account-has-been-debited message is signed by the payment server and sent to the repository 862.

The repository sends 864 a object-retrieval-is-allowed response to the RMS, and the repository disconnects from the RMS.

The RMS forwards 866 the object-retrieval-is-allowed response to the requesting system, and the RMS disconnects from the system.

The repository connects to the address/port specified in the request, and it transmits to the requesting system 868:
- the object's handle;
- the total amount debited from the account;
- the object, signed by the repository.

The repository sends a object-has-been-delivered confirmation to the RMS 870.

All of the transactions tracked and recorded in the above system could be used to feed an automated accounting system for a variety of purposes.

Retrieving Registration Information

The public access system will be based on a commercial DBMS. Queries to this system will be performed using standard database techniques via a direct connection or over a network.

Other embodiments are within the scope of the following claims.

What is claimed is:

1. A system for organizing digital information in a network that includes computational facilities comprising:
   digital objects, each of the digital objects comprising one or more sequences of structured data or sets of such sequences, each of the sequences or sets of sequences incorporating a work or a portion of a work or other digital information in which a party has rights or interests, or in which there is value, each of the sequences or sets of sequences being structured in a way that is interpretable by one or more of the computational facilities in the network,
   each of the digital objects including an identifier that uniquely identifies the digital object within the network and persists, with respect to the digital object, over a period of time that is at least as long as the existence of the digital object,
   an administrative mechanism that (a) is distributed among the computational facilities, (b) assures the uniqueness and persistence of the identifiers over a time period that is at least as long as the existence of the digital objects, and (c) distributes state information that includes the identifiers among computational facilities by an algorithmic process for managing the uniqueness and persistence of the identifiers, at least some of the digital objects including other structured data which is useful in processing the digital objects, including managing access to them, and
   a resolution mechanism that accepts unique identifiers as input and resolves each of the identifiers to state information that denotes a computational facility or other digital object that contains the digital object associated with the unique identifier.

2. The system of claim 1 further comprising
   repositories on the network in which digital objects are stored and from which they can be accessed.

3. The system of claim 1 further comprising validation information for at least some of the digital objects, the validation information being sufficient to permit a determination whether a purported instance of a digital object is identical to an original instance of the digital object.

4. The system of claim 3 which the validation information is stored separately from the corresponding digital object.

5. The system of claim 1 wherein the other structured data includes information about at least one of the following: registration of rights in the digital objects; accesses to and uses of digital objects; the terms and conditions for access and use of digital objects; the ownership and licensing of rights to digital objects; links between different digital objects.

6. The system of claim 5 in which the other structured data is stored separately from the corresponding digital object.

7. The system of claim 1 in which the resolution mechanism is scalable without requiring full replication of the state information and includes servers on the network, each of the servers storing information about states of the digital object including information that associates the identifiers with the locations of corresponding digital object in the network.

8. The system of claim 1 in which the administrative mechanism distributes the state information relatively evenly among all or a subset of the computational facilities.

9. The system of claim 1 further comprising a registering authority that processes applications for registration of rights or interests associated with digital information structured as digital objects, based on the digital objects, their identifiers, and validation information for each of the digital objects sufficient to determine whether a purported instance of a digital object is identical to an original instance.

10. The system of claim 1 further comprising an access mechanism for applying terms and conditions for access to each of the digital objects, the mechanism including information about the terms and conditions, and the mechanism being arranged to make the information about terms and conditions available to a user in connection with a request for access to one of the digital objects, to enable the user to indicate assent to the terms and conditions, and to permit access to the user only upon the user indicating assent to the terms and conditions.

11. The system of claim 1 further comprising a recordation server on the network, the recordation server storing information on rights or interests or value pertaining to the digital objects on the network.

12. The system of claim 1 further comprising a reference service on the network, separate from the digital objects, for recording information about accesses to and transactions associated with the digital objects, the information in the reference service being accessible to authorized users.

13. The system of claim 1 further comprising an identifier service, accessible on the network, for generating the unique identifiers, the service including servers each serving a portion of an identifier space.

14. The system of claim 1 further comprising an authorization server which provides information about terms and conditions for access to a digital object and authorizations for use of the digital object.

* * * * *

UNITED STATES PATENT AND TRADEMARK OFFICE
CERTIFICATE OF CORRECTION

PATENT NO. : 6,135,646
DATED : October 24, 2000
INVENTOR(S) : Robert E. Khan and David K. Ely It is certified that error appears in the above-identified patent and that said Letters Patent is hereby corrected as shown below:

Column 28,
Line 3, replace with:

--1. A system for organizing information in a network that includes computational facilities comprising:
digital objects, each of the digital objects comprising one or more sequences of bits or sets of such sequences, each of the sequences or sets of sequences incorporating a work or a portion of a work or other information in which a party has rights or interests, or in which there is value, each of the sequences or sets of sequences being structured in a way that is interpretable by one or more of the computational facilities in the network,
each of the digital objects having an identifier that uniquely identifies the digital object within the network and persists with respect to the digital object over a period of time that is at least as long as the existence of the digital object,
an administrative mechanism that (a) is distributed among the computational facilities, (b) assures the uniqueness and persistence of the identifiers over a time period that is at least as long as the existence of the digital objects, and (c) distributes state information that includes the identifiers among computational facilities by an algorithmic process for managing the uniqueness and persistence of the identifiers, at least some of the digital objects including other information which is useful in processing the digital objects, including managing access to them, and
a resolution mechanism that accepts unique identifiers as input and resolves each of the identifiers to state information that denotes a computational facility or other digital object that contains the digital object associated with the unique identifier.--

Column 29,
Line 9, replace claim 5 with

--5. The system of claim 1 wherein the other information includes at least one of the following: registration of rights in the digital objects; accesses to and uses of digital objects; the terms and conditions for access and use of digital objects; the ownership and licensing of rights to digital objects, links between different digital objects.

Line 16, replace claim 6 with
-- 6. The system of claim 5 in which the other information is stored separately from the corresponding digital object. --
Line 18, replace claim 7 with --7. The system of claim 1 in which
the resolution mechanism is scalable without requiring full replication of the state information and includes servers on the network, each of the servers storing information about the state of the digital object including information that associates the identifiers with the locations of corresponding digital objects in the network.--

UNITED STATES PATENT AND TRADEMARK OFFICE
CERTIFICATE OF CORRECTION

PATENT NO.   : 6,135,646
DATED        : October 24, 2000
INVENTOR(S)  : Robert E. Khan and David K. Ely It is certified that error appears in the above-identified patent and that said Letters Patent is hereby corrected as shown below:

Column 29 cont'd.,
Line 29, replace claim 9 with

--9. The system of claim 1 further comprising
a registration authority that processes applications for registration of rights or interests associated with information structured as digital objects, based on the digital objects, their identifiers, and validation information for each of the digital objects sufficient to determine whether a purported instance of a digital object is identical to an original instance.--

Column 30,
Line 1, replace with

--10. The system of claim 1 further comprising
an access mechanism for applying terms and conditions for access to each of the digital objects and/or the information incorporated therein,
the mechanism including information about the terms and conditions, and
the mechanism being arranged to make the information about terms and conditions available to a user in connection with a request for access to one of the digital objects and/or the information incorporated therein, to enable the user to indicate assent to the terms and conditions, and to permit access to the user only upon the user indicating assent to the terms and conditions.--

Line 19, replace claim 12 with

--12. The system of claim 1 further comprising
a reference service on the network, separate from the digital objects, for recording information about digital objects including accesses to and transactions associated with the digital objects, the information in the reference service being accessible to authorized users.--

UNITED STATES PATENT AND TRADEMARK OFFICE
CERTIFICATE OF CORRECTION

PATENT NO. : 6,135,646
DATED : October 24, 2000
INVENTOR(S) : Robert E. Khan and David K. Ely It is certified that error appears in the above-identified patent and that said Letters Patent is hereby corrected as shown below:

<u>Column 30, cont'd.,</u>
Line 30, replace claim 14 with

--14. The system of claim 1 further comprising
an authorization server which provides information about terms and conditions for access
to a digital object and/or the information incorporated therein and access to and
authorizations for use of the digital objects and/or the information incorporated therein.--

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,135,646 | |
| APPLICATION NO. | : 08/808050 | |
| DATED | : October 24, 2000 | |
| INVENTOR(S) | : Robert E. Kahn and David K. Ely | |

It is certified that error appears in the above-identified patent and that said Letters Patent is hereby corrected as shown below:

In the Specification

Column 7

Line 3, replace "In" with --It--.

Line 6, replace "It" with --In--.

Column 8

Line 41, replace "interests." with --interests).--.

Column 10

Line 44, delete "There are other systems".

Line 58, after "able" insert --to--.

Column 11

Line 38, replace the second instance of "handles" with --handle--.

Column 14

Line 25, replace "a" with --an--.

Line 31, replace "the" with --The--.

Column 15

Line 25, replace "PEN" with --PEM--.

This certificate supersedes the Certificate of Correction issued October 12, 2004.

Signed and Sealed this
Thirtieth Day of September, 2014

Michelle K. Lee
*Deputy Director of the United States Patent and Trademark Office*

Column 19

Line 63, replace "certificate"" with --certificate--.

Column 20

Line 65, delete the first instance of "is".

Column 25

Line 22, replace "possible" with --possibly--.

Line 46, replace "database." with --database;--.

Line 46, "the domain" should be moved to the next line at the margin like the other items listed in the paragraph.

Column 27

Line 32, delete the first instance of "transfer is not".

In the Claims

Column 28

Line 32, replace claim 1 with:

--1. A system for organizing information in a network that includes computational facilities comprising:
digital objects each of the digital objects comprising one or more sequences of bits or sets of such sequences each of the sequences or sets of sequences incorporating a work or a portion of a work or other information in which a party has rights or interests, or in which there is value, each of the sequences or sets of sequences being structured in a way that is interpretable by one or more of the computational facilities in the network,
each of the digital objects having an identifier that uniquely identifies the digital object within the network and persists with respect to the digital object over a period of time that is at least as long as the existence of the digital object, an administrative mechanism that (a) is distributed among the computational facilities, (b) assures the uniqueness and persistence of the identifiers over a time period that is at least as long as the existence of the digital objects, and (c) distributes state information that includes the identifiers among computational facilities by an algorithmic process for managing the uniqueness and persistence of the identifiers, at least some of the digital objects including other information which is useful in processing the digital objects, including managing access to them, and a resolution mechanism that accepts unique identifiers as input and resolves each of the identifiers to state information that denotes a computational facility or other digital object that contains the digital object associated with the unique identifier.--

Column 29

Line 7, replace claim 4 with:

--4. The system of claim 3 in which the validation information is stored separately from the corresponding digital object.--

Line 9, replace claim 5 with:

--5. The system of claim 1 wherein the other information includes at least one of the following: registration of rights in the digital objects; accesses to and uses of digital objects; the terms and conditions for access and use of digital objects; the ownership and licensing of rights to digital objects, links between different digital objects.--

Line 16, replace claim 6 with:

--6. The system of claim 5 in which the other information is stored separately from the corresponding digital object.--

Line 18, replace claim 7 with:

--7. The system of claim 1 in which
the resolution mechanism is scalable without requiring full replication of the state information and includes servers on the network, each of the servers storing information about the state of the digital object including information that associates the identifiers with the locations of corresponding digital objects in the network.--

Line 29, replace claim 9 with:

--9. The system of claim 1 further comprising
a registration authority that processes applications for registration of rights or interests associated with information structured as digital objects, based on the digital objects, their identifiers, and validation information for each of the digital objects sufficient to determine whether a purported instance of a digital object is identical to an original instance.--

Column 30

Line 1, replace claim 10 with:

--10. The system of claim 1 further comprising
an access mechanism for applying terms and conditions for access to each of the digital objects and/or the information incorporated therein,
the mechanism including information about the terms and conditions, and
the mechanism being arranged to make the information about terms and conditions available to a user in connection with a request for access to one of the digital objects and/or the information incorporated therein, to enable the user to indicate assent to the terms and conditions, and to permit access to the user only upon the user indicating assent to the terms and conditions.--

Column 30 (cont'd)

CERTIFICATE OF CORRECTION (continued)
U.S. Pat. No. 6,135,646

Line 19, replace claim 12 with:

--12. The system of claim 1 further comprising
a reference service on the network, separate from the digital objects, for recording information about digital objects including accesses to and transactions associated with the digital objects, the information in the reference service being accessible to authorized users.--

Line 26, replace claim 13 with:

--13. The system of claim 1 further comprising
an identifier service, accessible on the network, for generating the unique identifiers, the service including servers each serving a portion of an identifier space.--

Line 30, replace claim 14 with:

--14. The system of claim 1 further comprising
an authorization server which provides information about terms and conditions for access to a digital object and/or the information incorporated therein and access to and authorizations for use of the digital objects and/or the information incorporated therein.--